(12) United States Patent
Beer et al.

(10) Patent No.: US 12,515,268 B2
(45) Date of Patent: Jan. 6, 2026

(54) METHOD AND TOOL FOR CREATING A THROUGH-THREAD

(71) Applicant: EMUGE-WERK RICHARD GLIMPEL GMBH & CO. KG FABRIK FUR PRAZISIONSIONSWERKZEUGE, Lauf a.d. Pegnitz (DE)

(72) Inventors: Christian Beer, Poxdorf (DE); Bernhard Borschert, Bamberg (DE); Thomas Funk, Pegnitz (DE); Dietmar Hechtle, Pegnitz (DE); Manuel Leonhard, Lauf (DE); Lukas Poerner, Kirchensittenbach (DE); Martin Steinbach, Lauf (DE)

(73) Assignee: EMUGE-WERK RICHARD GLIMPEL GMBH & CO. KG FABRIK FUR PRAZISIONSWERKZEUGE, Lauf a.d. Pegnitz (DE)

( * ) Notice: Subject to any disclaimer, the term of this patent is extended or adjusted under 35 U.S.C. 154(b) by 540 days.

(21) Appl. No.: 17/642,596

(22) PCT Filed: Sep. 11, 2020

(86) PCT No.: PCT/EP2020/075472
§ 371 (c)(1),
(2) Date: Mar. 11, 2022

(87) PCT Pub. No.: WO2021/048354
PCT Pub. Date: Mar. 18, 2021

(65) Prior Publication Data
US 2022/0331894 A1    Oct. 20, 2022

(30) Foreign Application Priority Data
Sep. 13, 2019 (DE) ..................... 10 2019 124 679.2

(51) Int. Cl.
| | | |
|---|---|---|
| *B23G 1/16* | (2006.01) | |
| *B23B 51/10* | (2006.01) | |
| *B23G 5/20* | (2006.01) | |

(52) U.S. Cl.
CPC .............. *B23G 1/16* (2013.01); *B23B 51/102* (2013.01); *B23G 5/20* (2013.01); *B23G 2200/143* (2013.01); *B23G 2200/148* (2013.01)

(58) Field of Classification Search
CPC ........ B23G 2200/148; B23G 2200/143; B23G 2240/36; B23G 5/188; B23G 5/186;
(Continued)

(56) References Cited

U.S. PATENT DOCUMENTS 5,186,584 A * 2/1993 Muller .................... B23B 51/02
408/230
5,944,462 A * 8/1999 Woodward ............ B23B 51/102
408/222
(Continued)

FOREIGN PATENT DOCUMENTS

| CN | 109475956 A | 3/2019 |
|---|---|---|
| DE | 19927386 | 1/2001 |

(Continued)

OTHER PUBLICATIONS

English translation of FR 2913619 (Year: 2008).*
(Continued)

*Primary Examiner* — Alan Snyder
(74) *Attorney, Agent, or Firm* — Workman Nydegger

(57) ABSTRACT

In a method for creating a through-thread, thread creation means is moved in a screw-in movement in an axial forward direction (VR) through a workpiece from a first workpiece side to a second workpiece side opposite the first workpiece side such that the end face projects out of the workpiece, wherein the thread creation means is moved through the
(Continued)

workpiece, in particular along a first line which is a helical line, wherein then, to create at least one countersink, the thread creation means is moved in a countersinking movement, in particular along a second line that differs from the first line, and wherein, for subsequent withdrawal, the thread creation means is moved back through the workpiece in a screw-out movement in the axial backward direction (RR), in particular at least substantially along the first line.

28 Claims, 10 Drawing Sheets

(58) Field of Classification Search
CPC .......... B23G 5/184; B23G 5/182; B23G 5/18; B23G 5/20; B23G 1/16; B23B 51/102
See application file for complete search history.

(56) References Cited

U.S. PATENT DOCUMENTS

| | | | |
|---|---|---|---|
| 6,200,078 B1* | 3/2001 | Kubota | B23B 51/00 407/53 |
| 2019/0337060 A1* | 11/2019 | Kopton | B23G 5/06 |
| 2019/0351490 A1* | 11/2019 | Brohede | B23K 26/0006 |

FOREIGN PATENT DOCUMENTS

| | | | | |
|---|---|---|---|---|
| DE | 102005022503 | | 3/2006 | |
| DE | 102016008478 | | 1/2018 | |
| EP | 3031557 | A1 * | 6/2016 | ........... B23B 51/102 |
| FR | 2913619 | | 9/2008 | |
| FR | 2913619 | A3 | 9/2008 | |
| JP | 3831167 | | 10/2006 | |

OTHER PUBLICATIONS

International Preliminary Report on Patentability received for PCT Patent Application No. PCT/EP2020/075472, mailed on Mar. 24, 2022, 23 pages (11 pages of English Translation and 12 pages of Original Document).

International Search Report and Written Opinion for PCT/EP2020/075472 mailed Dec. 16, 2020.

Handbuch der Gewindetechnik und Frästechnik [Handbook of Thread and Milling Technology], by Emuge-Franken, published by Publicis Corporate Publishing in 2004 (ISBN 3-89578-232-7).

Office Action received for Chinese Patent Application No. 202080079315.3, mailed on Jan. 29, 2024, 1 page.

* cited by examiner

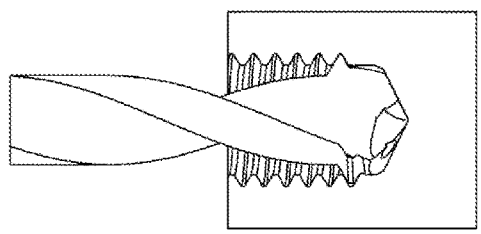
FIG 1f
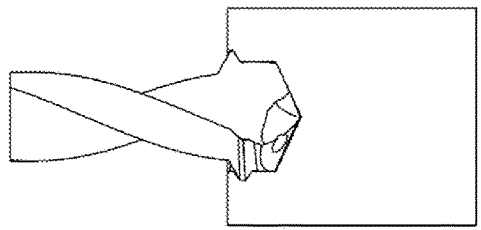
FIG 1e
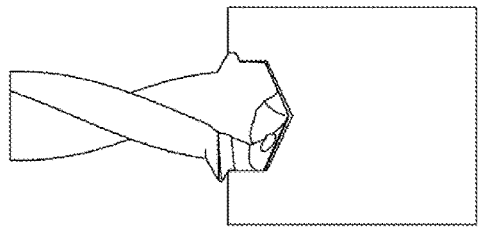
FIG 1d
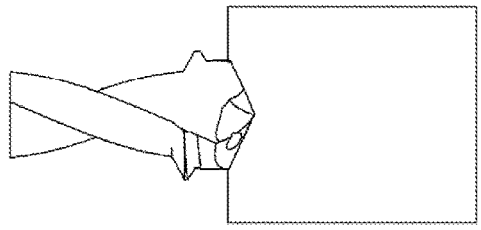
FIG 1c
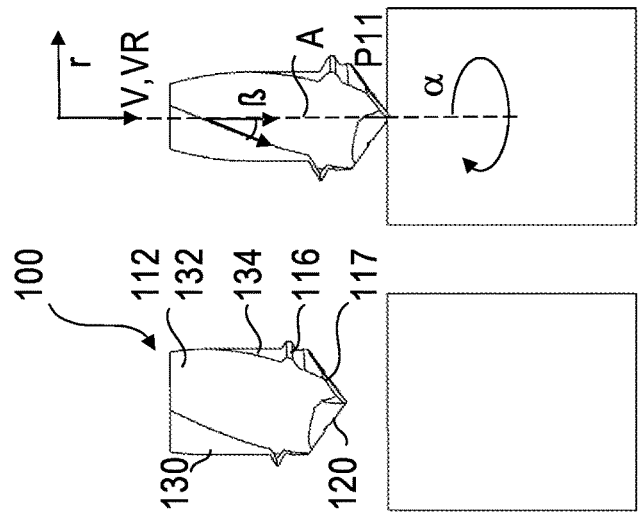
FIG 1b
FIG 1a

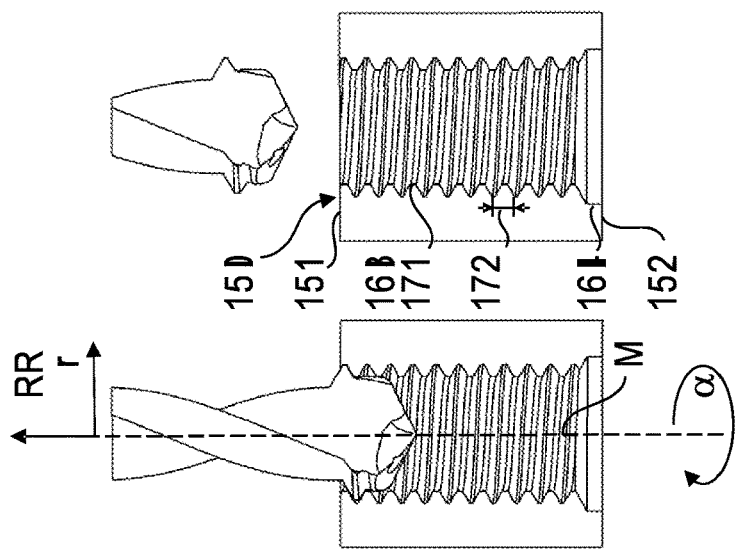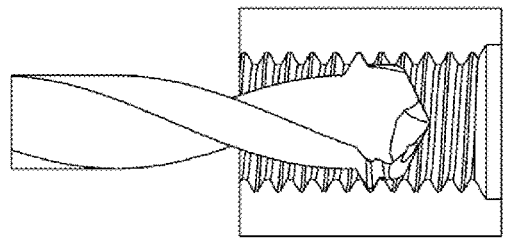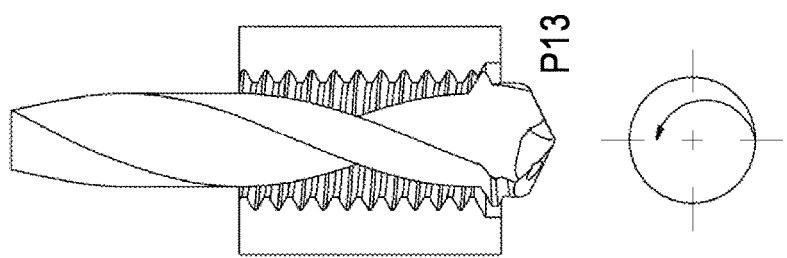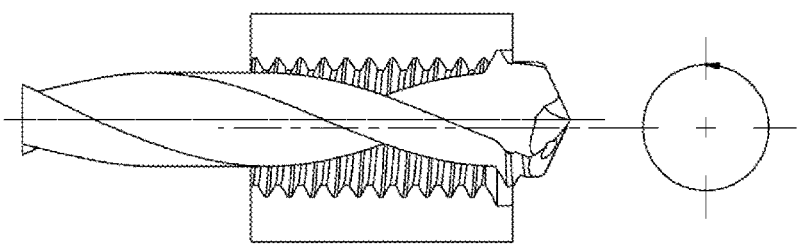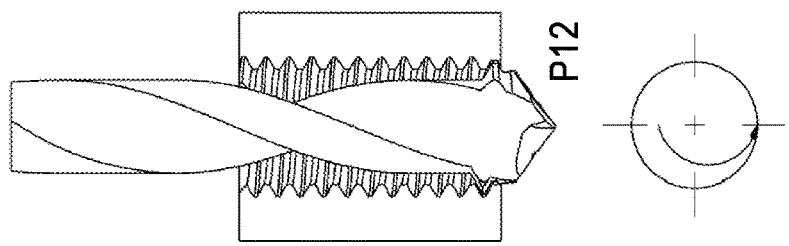

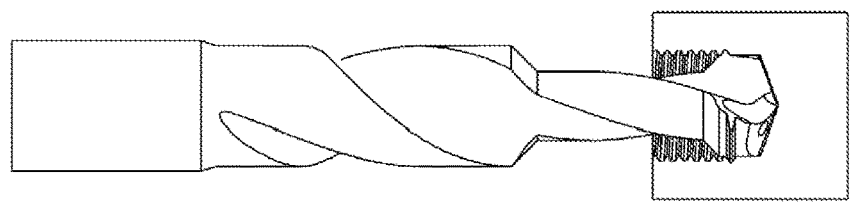
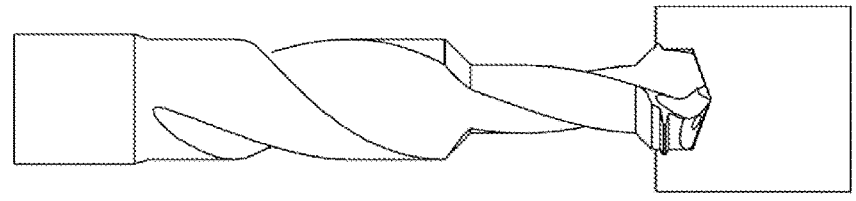
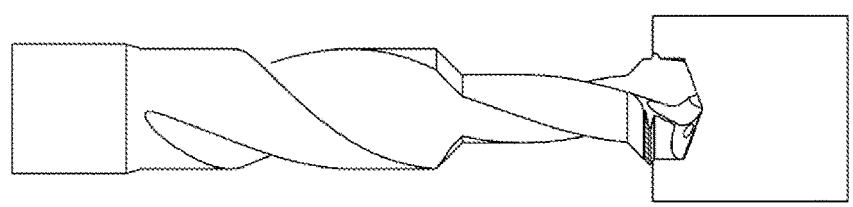
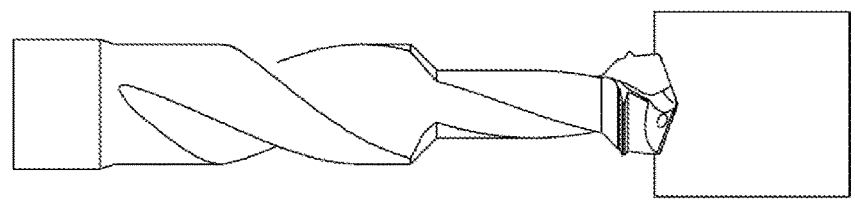
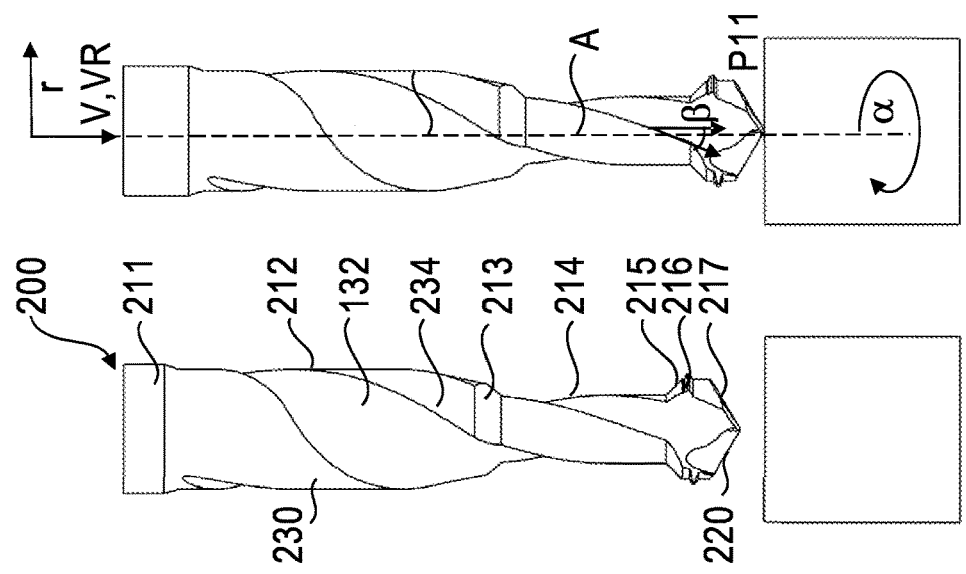

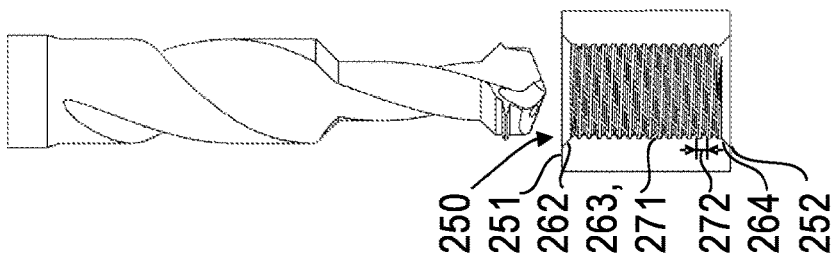
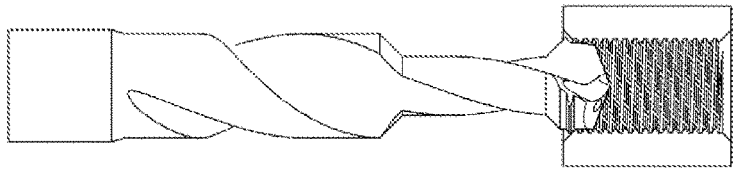
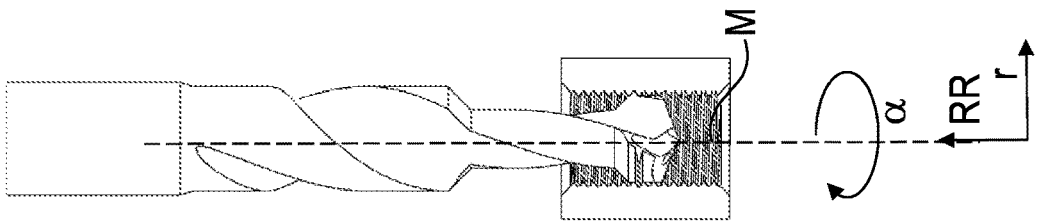
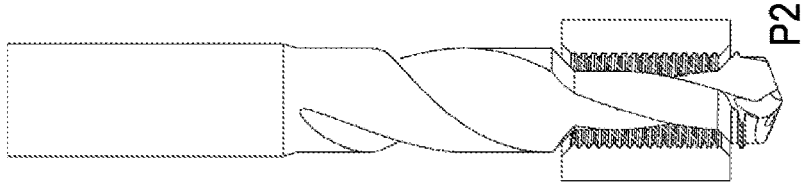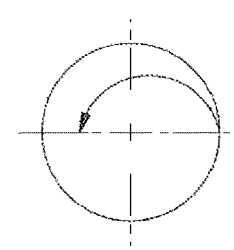
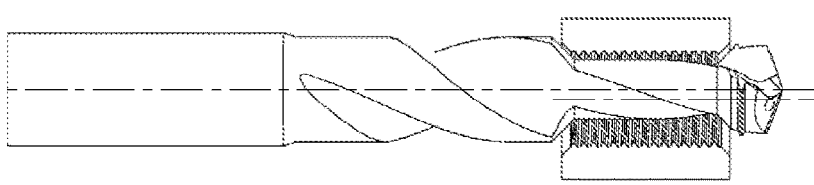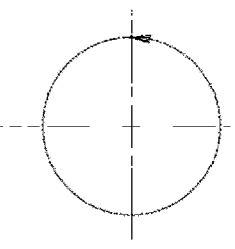
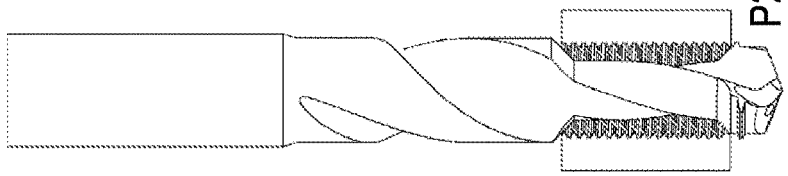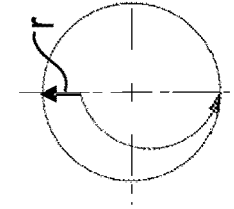
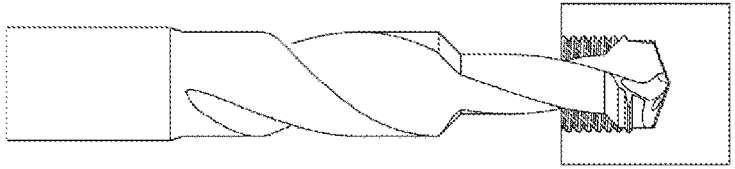

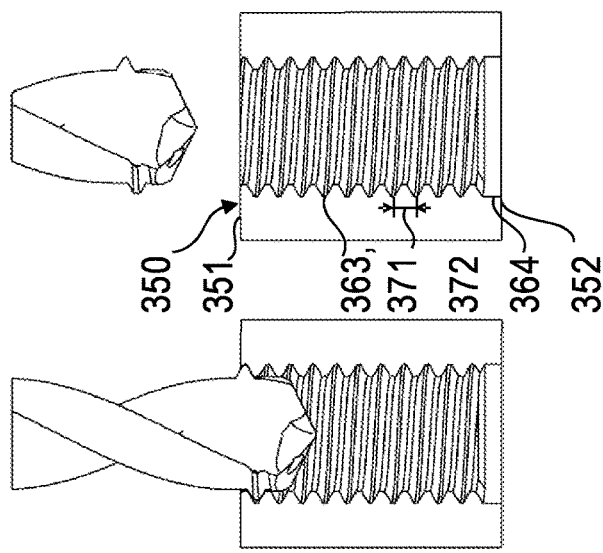
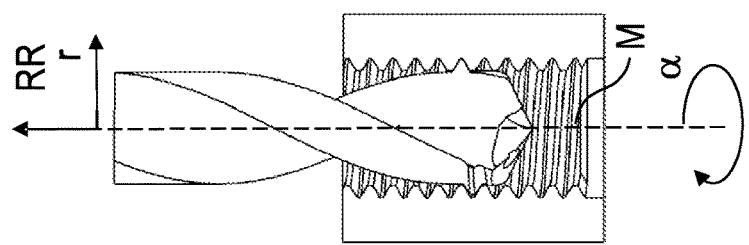
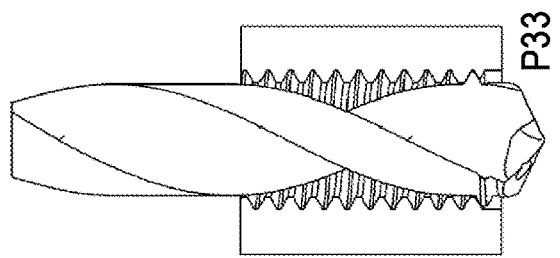
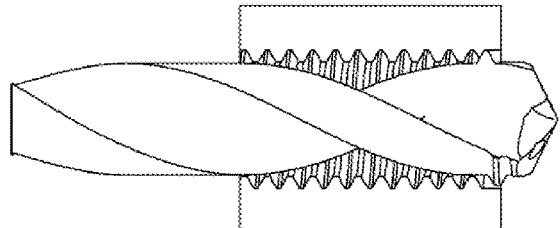
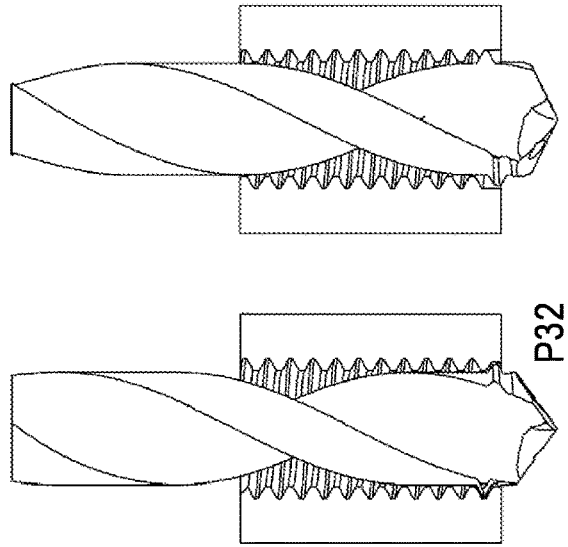

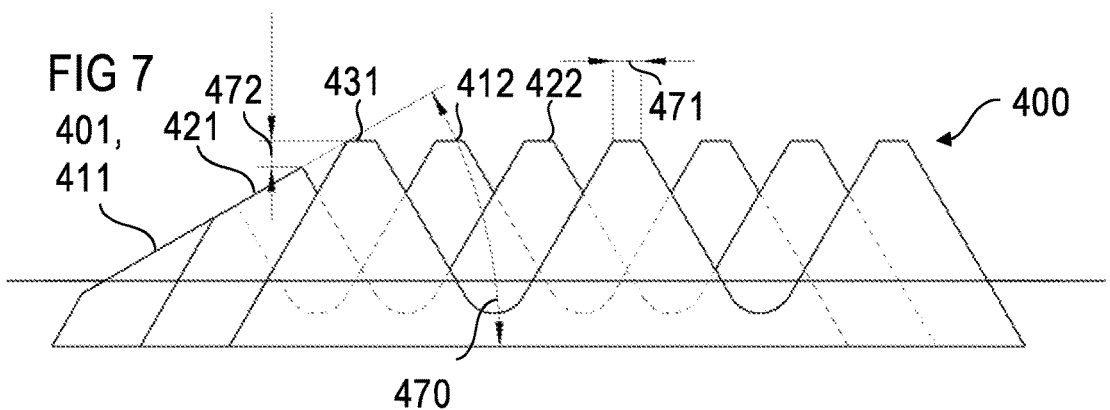
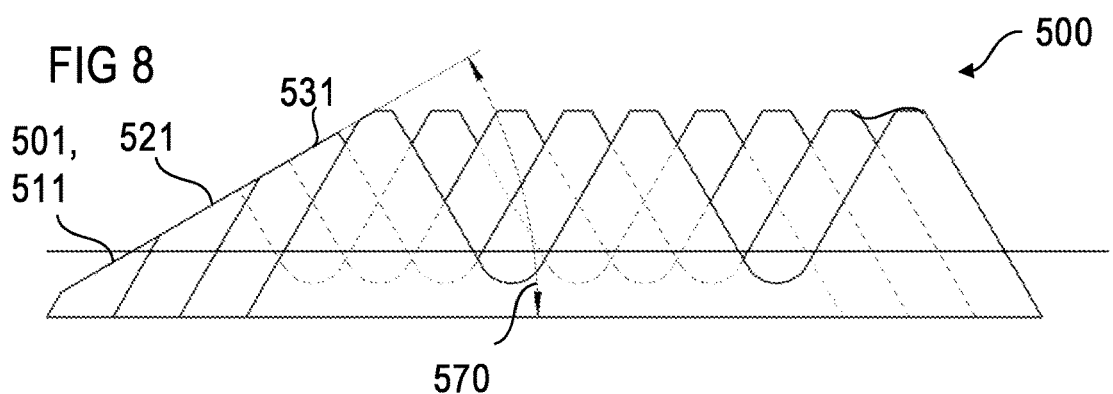
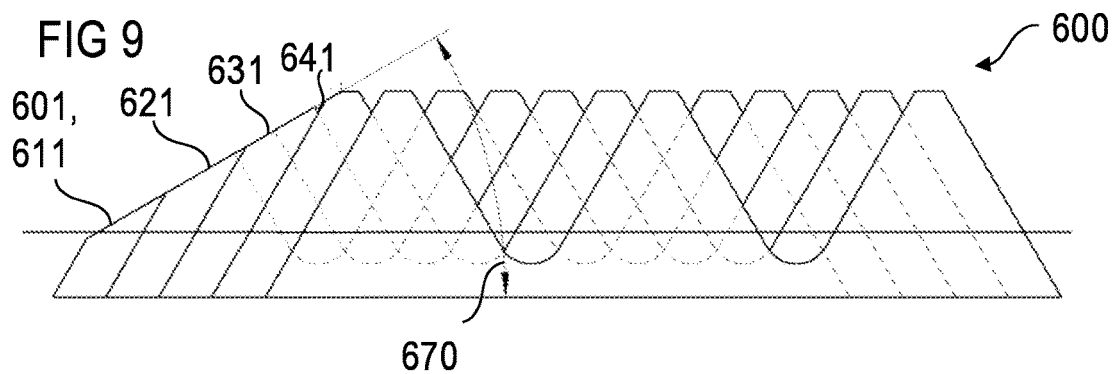
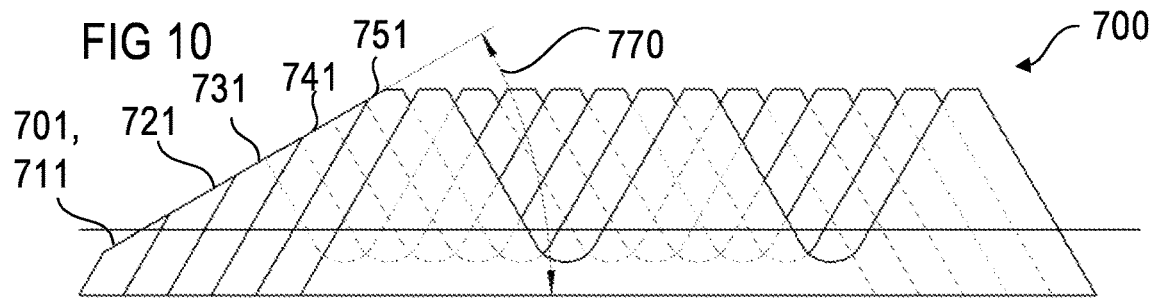

METHOD AND TOOL FOR CREATING A THROUGH-THREAD

CROSS-REFERENCE TO RELATED APPLICATIONS

The present invention is a 35 U.S.C. § 371 U.S. National Stage of PCT Application No. PCT/EP2020/075472 filed on Sep. 11, 2020, which claims the benefit of priority to German Patent Application No. 10 2019 124 679.2, filed on Sep. 13, 2019. The entire content of each of the aforementioned patent applications is incorporated herein by reference.

BACKGROUND OF THE INVENTION

1. Field of the Invention

The invention relates to a method for creating a through-thread, in particular a through-threaded hole.

2. The Relevant Technology

A thread has a helical or helix-shaped thread groove with a constant thread pitch and can be produced as an internal thread or as an external thread. To create an internal thread, the procedure is as a rule first of all to create a core hole (or: a core drill hole) in the workpiece, which can, in particular, be a through-hole, and then to create the thread groove in the inner wall of the core hole. The core hole with the thread is also referred to as a threaded hole.

For thread creation or thread finishing, both chip-removing and non-cutting methods and thread tools are known. Chip-removing thread creation is based on material removal of the material of the workpiece in the region of the thread groove. Non-cutting thread creation is based on forming the workpiece and creating the thread groove in the workpiece by pressure. An overview of thread creation tools and working methods in use can be found in Handbuch der Gewindetechnik and Frästechnik [Handbook of Thread Technology and Milling Technology], edited by: EMUGE-FRANKEN, Publisher: Publicis Corporate Publishing, Year of publication: 2004 (ISBN 3-89578-232-7), hereinafter referred to simply as "EMUGE Handbook".

Thread creation by chip removal or machining encompasses thread-cutting taps (cf. EMUGE Handbook, Chapter 8, pages 181 to 298), thread-milling cutters (cf. EMUGE Handbook, Chapter 10, pages 325 to 372) and, only for external threads, thread-cutting dies (cf. EMUGE Handbook, Chapter 11, pages 373 to 404).

A thread-cutting tap is a thread-cutting tool whose cutting edges or thread-cutting teeth are arranged along an external thread at the thread pitch of the thread to be created. In creating the thread, the thread-cutting tap is moved into a cylindrical core hole in a workpiece with an axial feed with respect to the tool axis and with rotation about its tool axis at a speed of rotation dependent on the axial feed rate corresponding to the thread pitch, wherein the tool axis of the thread-cutting tap is aligned coaxially with the center axis of the core hole and its cutting edges are in continuous engagement with the workpiece at the core hole wall (continuous cut), giving rise to a continuous thread groove on the core hole wall. Typical geometries of a thread-cutting tap with the usual taper start region are described in EMUGE Handbook, Chapter 8, pages 250 and 251 and 284 and 285. In the cutting direction, the thread-cutting teeth have, in a cross section perpendicular to the helix, a cutting profile or effective profile on the outer edge and, adjoining it toward the inside, a rake face and, on the tooth back adjoining it in the opposite direction to the cutting direction, clearance faces or clearance angles, with the result that there is no contact there and therefore no friction with the workpiece. A typical distribution of the individual effective thread profiles of the thread-cutting teeth, which are ground obliquely in the taper start region, with the corresponding chip division is shown in EMUGE Handbook, Chapter 9, page 322.

A thread-cutting process with a thread-cutting tap is explained together with a typical torque curve in EMUGE Handbook, Chapter 8, page 255.

Chipless thread creation tools encompass what are known as thread-forming taps (cf. EMUGE Handbook, Chapter 9, pages 299 to 324) and, only for external threads, thread-rolling tools (cf. EMUGE Handbook, Chapter 11, pages 373 to 404).

Thread-forming taps are threading tools which have an approximately spiral or helical circumferential thread profile, along which a plurality of pressure lugs (also referred to as forming teeth, furrowing teeth or forming wedges) are arranged, which are formed by mutually offset, further outwardly projecting and generally rounded polygon corner regions of an approximately polygonal cross section of the thread-forming tap.

In creating the thread, the thread-forming tap is moved into a cylindrical core hole in a workpiece in a manner similar to the thread-cutting tap with an axial feed with respect to the tool axis and with rotation about its tool axis, wherein the tool axis of the thread-cutting tap is aligned coaxially with the center axis of the core hole. The speed of rotation and the axial feed rate are matched to one another in accordance with the thread pitch.

The pressure lugs of the thread-forming tap are in continuous engagement with the workpiece at the core hole wall and press the thread groove into the core hole wall by plastic deformation, giving rise to a continuous thread groove in the core hole wall. Typical geometries of a thread-forming tap with the usual initial forming region are described in EMUGE Handbook, Chapter 9, pages 308 and 309.

A typical distribution of the individual effective thread profiles of the thread-forming teeth, which rise in the initial forming region, is shown in EMUGE Handbook, Chapter 9, page 322. The thread-forming operation with a thread-forming tap is explained together with a typical torque curve in EMUGE Handbook, Chapter 9, page 310.

Thread-cutting taps and thread-forming taps operate with an exclusively axial feed or working movement with a rotary movement about their own tool axis which is synchronized in accordance with the thread pitch. The direction of rotation of the thread-cutting tap and thread-forming tap when creating the thread corresponds to the thread direction of the thread to be created. When the thread groove has been created, or at the end of the creation of the thread groove, the tool is braked and brought to a standstill at a reversal point. The braking before reaching the reversing or reversal point is normally effected by a reduction of the axial feed rate and speed of rotation to a value of 0 in each case, which reduction is synchronized in accordance with the constant thread pitch.

In order to retrieve the tool from the workpiece, a backward or reversing movement is now initiated, in which the axial feed direction and the direction of rotation are exactly opposite to the working movement, and the axial feed movement and the rotary movement are again synchronized in accordance with the thread pitch to avoid damaging the thread.

Fundamentals of the program structure for CNC machines in respect of thread creation are given in EMUGE Handbook, Chapter 8, page 281, and Chapter 10, pages 357 to 359.

Core hole drilling is described in EMUGE Handbook, Chapter 7, pages 161 to 179.

Furthermore, combination tools are known in various embodiments, with which a threaded hole is created in the solid material of the workpiece with the same tool in a single working step, that is to say without prior drilling of a core hole.

These include drill/thread mills, which work exclusively by removing chips (BGF; cf. EMUGE Handbook, Chapter 10, page 354), and what are referred to as circular drill/thread mills (ZBGF; cf. EMUGE Handbook, Chapter 10, page 355).

After a through-thread has been produced, however, edges, in particular sharp edges, protrusions and burrs, can arise at the start and end of the through-thread on the workpiece sides, which edges impair the desired proper functioning and use of the thread, with the result that, for example, damage can occur to the thread, workpiece or a screw which is to be screwed in.

In order to remove these edges, in particular sharp edges, protrusions and burrs, and/or to facilitate easier, more stable introduction of a screw to be screwed in, and to make the thread more robust overall, it is possible to add a countersink, in particular as a chamfer or undercut, on the workpiece sides or on at least one workpiece side. However, a separate operation and/or a separate tool are/is required for this purpose.

BRIEF SUMMARY OF THE INVENTION

The invention is thus based on the insight that with known methods and tools for removing these edges, in particular sharp edges, protrusions and burrs, additional operations and/or a separate tool are/is required, leading to increased work and tool expenditure.

It is then the underlying object of the invention to specify a method for creating a through-thread, in particular a through-threaded hole, in which the through-thread can be created together with a threaded hole in solid material or else in an already created core hole in the workpiece.

In particular, the intention in the method is preferably also to achieve a further reduction or at least to minimize the loading on the tool by axial forces during countersinking, in which, for example, a circumferential groove can be formed.

Embodiments and objects according to the invention which are suitable for achieving this object are specified, in particular, in the patent claims, which are directed to a method for creating a through-thread, in particular a through-threaded hole, in particular having the features of independent patent claim 1, and to a tool.

Further embodiments and further developments according to the invention will be found in the respective dependent patent claims.

The combinations of features and objects according to the invention which can be claimed are not restricted to the chosen wording and the chosen dependency references of the patent claims. On the contrary, any feature of one category of claim, for example a method, can also be claimed in a different category of claim, for example a device.

Furthermore, any feature in the patent claims can be claimed in any desired combination with one or more other feature(s) in the patent claims, even irrespective of their dependency references. Moreover, each of the features described or disclosed in the description or drawing may be claimed individually, independently or separately from the context in which it stands, alone or in any combination with one or more other features described or disclosed in the patent claims or in the description or drawing.

The method according to the invention is provided for creating a through-thread, in particular a through-threaded hole, with a predefined thread pitch and with a predefined thread profile with at least one countersink in a workpiece by means of a tool, a) in which the tool can be rotated about a tool axis extending through the tool and moved axially in relation to the tool axis, in particular by means of a turning device, b) wherein the tool has, sequentially in the direction of the end face thereof,
  b1) a shank region, in particular for coupling to the turning device,
  b2) at least one neck region, in particular with one or two flute and/or helical flute regions, for transporting away chips,
  b3) a thread creation region with a thread creation means for creating the through-thread, and
  b4) an end region having the end face, c) wherein, to create the through-thread, the thread creation means is moved in a screw-in movement in an axial forward direction through the workpiece from a first workpiece side to a second workpiece side opposite the first workpiece side such that the end face projects out of the workpiece, wherein the thread creation means is moved through the workpiece, in particular along a first line which is a helical line, d) wherein then, to create at least one countersink, the thread creation means is moved in a countersinking movement, in particular along a second line that differs from the first line, and e) wherein, for subsequent withdrawal, the thread creation means is moved back through the workpiece in a screw-out movement in an axial backward direction, in particular at least substantially along the first line.

In this context, the wording "in the direction of the end face thereof" preferably means a direction from the shank region to the end region and/or a direction along the tool axis from the shank region to the end region.

The term "at the end" preferably means arrangement in the end region and/or on the end face and/or in the direction of the end face and/or in the direction of the end region.

The term "shank-side" preferably means arrangement in the shank region and/or on the shank side and/or in the direction, in particular along the tool axis, of the shank side and/or in the direction, in particular along the tool axis, of the shank region.

With the aid of the method according to the invention, it is possible, in particular, to create a through-thread within a single operation and with the aid of a single tool. In this way, a through-thread can be created at lower cost and/or more quickly and/or more simply and/or more precisely.

A through-thread for the purposes of the invention is understood, in particular, to mean an internal thread which extends completely through the workpiece, in particular from one workpiece side to the opposite workpiece side and/or from one/the first workpiece side to one/the second workpiece side. On at least one side of the workpiece, the through-thread in the sense according to the invention has a countersink, which can, in particular, be cylindrical or conical.

A screw-in movement in the sense according to the invention is to be understood, in particular, to mean a movement of the tool by means of which the through-thread is created, more specifically in particular by movement of the thread creation means along a helical line. The through-thread can be created, in particular, by cutting, milling, forming and/or rolling, and thus, in particular, as thread cutting, thread milling, thread forming and/or thread rolling.

In the sense according to the invention, a countersinking movement is to be understood, in particular, to mean a movement of the tool by means of which a countersink is created, preferably a rotary movement, a circular movement and/or a movement along a circular line and/or a circular movement and/or a rotary movement about a single axis. The countersinking movement preferably takes place without an axial feed and/or with an axial feed which is reduced in relation to the screw-in movement.

A circular movement in the sense according to the invention is to be understood, in particular, to mean a movement of the tool in which the tool axis is deflected by a predefined radius from the thread center axis, and the tool is moved on a circular path with the predefined radius about the thread center axis, wherein the tool is additionally rotated about its tool axis.

A screw-out movement in the sense according to the invention is to be understood, in particular, to mean a movement of the tool by means of which the thread creation means and thus the tool as a whole are moved out of the through-thread, more specifically once again, in particular, by movement of the thread creation means along at least substantially the same helical line, preferably along the same helical line, as in the screw-in movement, to avoid destroying the previously created thread. The screw-out movement preferably takes place in the opposite direction in comparison with the screw-in movement.

In one embodiment, to create the through-thread, the thread creation means is moved in the screw-in movement in the axial forward direction through the workpiece from a first position on a first workpiece side to a second position on a second workpiece side opposite the first workpiece side, such that the end face projects out of the workpiece at the second position, and the thread creation means is moved through the workpiece along a first line, which is a helical line.

Then, to create at least one countersink in the countersinking movement, the thread profile is preferably moved in a rotary movement from the second position along a second line that differs from the first line to a third position or back to the second position.

For subsequent withdrawal, the thread creation means is preferably moved back in the screw-out movement from the second position, or from the third position, through the workpiece along the first line to the first position in an axial backward direction.

A movement or through movement along a first line through the workpiece is understood, in particular, to mean a movement or through movement along a helical line and/or along a helix and/or along a cylindrical spiral and/or along a coil. In particular, such a helical line can have a constant first pitch.

A movement along a second line that differs from the first line is understood, in particular, to mean a movement along a line that, for example, has a constant second pitch that differs from the first pitch and, in particular, is less than the first pitch. In one embodiment, the second pitch can also have the value zero.

Preferably, the screw-in movement comprises a rotary movement of the tool with a predefined direction of rotation about the tool axis and an axial feed movement, which is synchronized with the rotary movement according to the thread pitch, in the axial forward direction axially with respect to the tool axis such that an axial feed of the tool by the predefined thread pitch corresponds to a full revolution of the tool about the tool axis.

In one embodiment, this takes place in such a way that the thread creation means is moved through the workpiece on a first line in order to create the through-thread, wherein the first line is a helical line.

The second line preferably comprises a second helical line in the axial forward direction and/or in the backward direction such that less than an axial feed of the tool by the predefined thread pitch corresponds to a full revolution of the tool about the tool axis, or the second line comprises a circular movement with an at least substantially constant axial feed.

In particular, a preferred possibility in the method is also that of achieving a further reduction or at least of minimizing the loading on the tool by axial forces during countersinking, in which, for example, a circumferential groove can be formed. This can be accomplished, in particular, in that, during countersinking, the speed of rotation of the tool is kept at least partially constant relative to the speed of rotation during the screw-in movement and/or during the screw-out movement.

In particular, a thread tapping stroke and subsequently an oppositely directed reversing stroke can be performed. In the thread tapping stroke, it is possible, on the one hand, for the main cutting edge to create the core hole bore and, on the other hand, for the thread profile to create the internal thread on the inner wall of the core hole bore until the second workpiece side is reached. The thread tapping stroke is, in particular, carried out in a thread tapping feed at a speed of rotation of the thread-cutting tool which is synchronized therewith. In a subsequent reversing stroke in the opposite direction, the thread-cutting tool can be guided out of the threaded bore in a reversing direction, preferably with an opposite reversing feed and a reversing speed of rotation synchronized therewith. It is thereby possible to ensure that the thread profile of the thread-cutting tool is moved in a load-free manner in the thread groove of the internal thread.

In one embodiment, the thread creation region comprises the thread creation means. In particular, the thread creation region can be arranged at and/or near the end face. The thread creation means can comprise a thread groove, in particular exactly one thread groove. The thread creation means is preferably interrupted by at least one flute. In particular, this enables or facilitates the removal of chips produced.

The thread creation means preferably has at least one thread tooth, which is designed and arranged to match the predefined thread pitch, and has an effective profile which corresponds to the thread profile of the through-thread. In particular, the at least one thread tooth cuts the thread into the workpiece.

The at least one thread tooth is preferably moved through the workpiece on the helical line during the screw-in movement.

The thread profile can be formed by at least one thread-cutting tooth on the outer-circumferential back surface of the tap body. The tooth height of the cutting tooth is preferably dimensioned in such a way in the radial direction that the cutting tooth projects beyond the main cutting edge in the radial direction toward the outside by a radial offset. As an option, the cutting tooth can extend the main cutting edge flush with the surface in the radial direction toward the outside. Alternatively and/or additionally, the cutting tooth can be arranged behind the main cutting edge by an axial offset when viewed in the axial direction.

In one embodiment, the at least one neck region has a first neck region and a second neck region. In particular, the first neck region has a first neck diameter and the second neck region has a second neck diameter. The first neck diameter is preferably larger than the second neck diameter.

A first conical region is preferably arranged between the neck region and the thread creation region.

A second conical region is preferably arranged between the first neck region and the second neck region. In particular, the first conical region tapers the neck diameter of the tool in the direction of the end face. The second conical region preferably widens the neck diameter of the tool in the direction of the end face.

In particular, the end region can comprise a drilling region for drilling a through-hole.

In one embodiment, the drilling region comprises at least two end and/or main cutting edges, wherein a guide region is preferably formed on the outer sides thereof. In particular, the guide region can be of cylindrical design. In particular, the two end and/or main cutting edges can each interrupt the guide region.

In one embodiment, the second neck region has a smaller diameter than the guide region of the drilling region. This makes possible, in particular, the execution of a circular movement by the tool, by means of which a first countersink is or can be produced on the second workpiece side by means of a first countersinking means and/or a second countersink is or can be produced on the first workpiece side by means of a second countersinking means. Between the second neck region and the guide region of the drilling region, there is preferably arranged the first conical region, by means of which the diameter in the guide region is reduced to the diameter in the second neck region.

It is particularly advantageous if the diameter of the second neck region is reduced with respect to the diameter of the guide region of the drilling region by more than twice the radius by which the tool axis of the tool is deflected from the thread center axis during a circular movement.

In particular, the second neck region can have a smaller diameter than the thread creation region. This too makes possible, in particular, the execution of a circular movement by the tool.

The through-hole, the through-thread and the at least one countersink are preferably created in one operation by means of the same tool, in particular by means of a feed movement in the forward direction on the helical line, a countersinking process directly following this and a backward movement, directly following this, in the backward direction on the helical line.

In one embodiment, from the at least one neck region as far as the end face, exactly two, exactly three, at least two or at least three tap bodies extend parallel to the tool axis or spirally with a twist angle about the tool axis, and are separated from one another by flutes.

The flutes can extend from the end and/or main cutting edges through the thread creation region and the at least one flute or neck region, thus enabling chips to be transported away rearward from the end and/or main cutting edges.

In one embodiment, a first countersinking means comprises the first conical region and/or the thread creation region, wherein, in particular, the first conical region can merge directly into the thread creation region.

In particular, the countersinking means can be formed exclusively by the thread creation region.

In one embodiment, a first countersinking means is formed by the first conical region on the tool. In one embodiment, a second countersinking means is formed by the second conical region on the tool.

The distance between the first and second countersinking means preferably corresponds substantially to the thickness of the workpiece.

In one embodiment, during the creation of the through-thread, a through-hole is simultaneously produced by means of the tool during the screw-in movement. In one embodiment, the through-thread is created in a through-hole.

The first position is preferably arranged at an entry point to the workpiece and/or the second position is arranged at an exit point from the workpiece.

In one embodiment, the countersinking movement is or comprises a circular movement by means of which a first countersink is produced on the second workpiece side by means of a first countersinking means.

In a further embodiment, the countersinking movement is or comprises a circular movement by means of which a first countersink is produced on the second workpiece side by means of a first countersinking means and a second countersink is produced on the first workpiece side by means of a second countersinking means.

The tool axis of the tool is preferably deflected by a predefined radius from the thread center axis during the circular movement, and the tool is moved on a circular path with the predefined radius about the thread center axis, wherein the tool is additionally rotated about its tool axis.

In a particularly advantageous embodiment, during the countersinking movement, a first countersink is made by means of the first countersinking means through the first conical region on the tool and a second countersink is simultaneously made by means of the second countersinking means through the second conical region on the tool. In this way, a first countersink can be created on the second workpiece side and a second countersink can be created on the first workpiece side simultaneously within a single, in particular uniform, countersinking movement.

In an advantageous embodiment, the countersink is conical, with a maximum diameter which is greater than the maximum diameter of the thread profile or equal to the maximum diameter of the thread profile.

In a further embodiment, the countersink creates a chamfer, in particular on the first and/or second workpiece side and/or at the start and/or end of the through-thread.

Preferably, the countersinking movement is or comprises a movement of the thread creation means and/or of the tool along a circular line by means of which a countersink, in particular a cylindrical countersink, is produced on the first workpiece side by means of a/the first countersinking means.

In particular, the countersinking movement is a non-helical movement by means of which a countersink is produced on the second workpiece side.

The feed is preferably at least temporarily reduced during the countersinking movement, in particular in such a way that the feed during one revolution of the tool is less than the predefined thread pitch. This embodiment is at least comparatively simple to implement because only the feed of the tool has to be adapted, but the speed of rotation of the tool can preferably remain constant, and no separate tool region is required for producing the countersink.

In particular, the countersinking movement takes place in the forward direction and/or in the backward direction and/or as reverse countersinking.

To create the countersink, the end face is preferably moved from the second position to the third position in the forward direction, and the second and third positions each lie on the helical line or a helical line.

In one embodiment, to create the countersink, the end face is moved from the second position to the third position in the backward direction, and the second and third positions each lie on the helical line.

To create the countersink, it is possible, in particular, for the end face to be moved in the forward direction from the second position to the third position and then in the backward direction again to the second position.

In a further embodiment, the countersink is cylindrical, with a diameter which is greater than the maximum diameter or equal to the maximum diameter of the thread profile.

The countersink is preferably created on the first and/or second workpiece side and/or at the start and/or end of the through-thread.

In one embodiment, at least one feed and one rotation angle are assigned to each position of the tool.

A position can be defined, in particular, by a rotation angle, a linear displacement in the axial direction and, in particular, a radial deflection of the tool with the tool axis from the thread center axis.

The invention furthermore relates to a tool, in particular for carrying out the method according to the invention, having an end face, comprising sequentially in the direction of the end face thereof a shank region, in particular for coupling to the turning device, at least one neck region, in particular with one or two flute and/or helical flute regions, for transporting away chips, a thread creation region with a thread creation means for creating the through-thread, and an end region having the end face.

The tool for carrying out the method and/or according to the invention can comprise a thread cutter, a thread-milling cutter, a thread-forming tap and/or a thread-cutting tap.

The tool for carrying out the method can, in particular, be a monolithic tool. In particular, in one embodiment, the tool, together with its thread creation region, in particular together with its thread creation means, is of integral design. In particular, the thread creation means can be one or more thread-cutting teeth which are connected in one piece and/or monolithically to the tool. In particular, the stability of the tool can thereby be increased.

In particular, the tool together with its thread-cutting teeth can be of integral design, wherein the thread-cutting teeth preferably both create the through-thread and also form the at least one countersink.

The turning device is or preferably comprises a CNC machine and/or a machine tool, in particular with CNC control.

In one embodiment, use is made of a combined tool which can be rotated about a tool axis extending through the tool and moved axially in relation to the tool axis and which has a drilling region at a front or free end and a thread creation region which is arranged offset axially with respect to the tool axis, relative to the drilling region, and projects further outward radially with respect to the tool axis than the drilling region.

During a working or screw-in movement, the drilling region of the tool then produces a through-hole in the workpiece, and the thread creation region produces a thread groove at the predefined thread pitch in the surface of this through-hole.

On the basis of the invention, a synergistic effect is produced in at least one way. In particular, the method according to the invention makes it possible for both the thread and the at least one countersink, and also, preferably, the associated drill hole, to be produced in a single operation and by means of a single tool. Inter alia, this makes it possible to reduce the number of different tools that have to be kept ready. Moreover, the time required to create the thread with the at least one countersink, as well as preferably the associated drill hole, is reduced.

In particular, in a preferred embodiment, the method according to the invention makes it possible for both the thread and two countersinks on both workpiece sides, and also preferably the associated drill hole, to be created in a single operation and by means of a single tool.

In particular, in a preferred embodiment, the method according to the invention makes it possible for the thread creation means to be the countersinking means at the same time. In this case, the countersink can even be produced solely by reducing the feed of the tool.

Furthermore, the method according to the invention makes it possible for both one or even two conical or even cylindrical countersinks to be created in this one operation.

In one embodiment, the thread creation means has a contour of revolution.

In particular, the contour of revolution can form a cutting edge contour for the at least one countersink. In particular, the contour of revolution can form an envelope curve and/or envelope contour, wherein the envelope curve and/or envelope contour are/is formed by countersink cutting edges.

An envelope curve and/or envelope contour and/or contour of revolution is, in particular, the envelope curve and/or envelope contour and/or contour of revolution and/or contour obtained when the tool is rotated about its tool axis.

In one embodiment, the end region comprises a drilling region for drilling a through-hole.

The drilling region preferably comprises at least two end and/or main cutting edges, in particular on at least two tap bodies, for creating the through-hole, which extend into the thread creation region for creating the through-thread.

Flutes preferably extend between the end and/or main cutting edges through the thread creation region and into the at least one flute or neck region.

In at least one embodiment, the at least two end and/or main cutting edges form the countersink cutting edges and/or the contour of revolution on the outside diameter.

The tool, in particular the thread creation means, is preferably designed in such a way that it has or creates an at least substantially closed envelope curve and/or envelope contour.

In particular, in at least one embodiment, the tool is designed in such a way that it has or creates a closed envelope curve and/or envelope contour.

In at least one embodiment, the tool has at least three end and/or main cutting edges, in particular at least four end and/or main cutting edges, preferably at least five end and/or main cutting edges.

In at least one embodiment, the countersink has a countersink angle which is greater than 25° and less than 60°, preferably between 30° and 45°, in particular at least substantially 30°.

The envelope curve and/or envelope contour are/is preferably formed by at least one first end and/or main cutting edge, in particular a first shank-side thread-cutting tooth, as a first countersink cutting edge and a second end and/or main cutting edge, in particular a second shank-side thread-cutting tooth, as a second countersink cutting edge, which, in particular jointly, form a closed envelope curve and/or envelope contour during rotation.

The envelope curve and/or envelope contour are/is preferably formed by at least one first end and/or main cutting edge, in particular a first thread-cutting tooth, as a first countersink cutting edge and a second end and/or main cutting edge, in particular a second thread-cutting tooth, as a second countersink cutting edge, which, in particular jointly, form a closed envelope curve and/or envelope contour during rotation.

In one embodiment, the thread creation means comprises at least one shank-side thread-cutting tooth or at least two shank-side thread-cutting teeth, and at least one end-side thread-cutting tooth, in particular on each end and/or main cutting edge and/or on each tap body. The at least one shank-side thread-cutting tooth or the at least two shank-side thread-cutting teeth, and the at least one end-side thread-cutting tooth are preferably arranged directly one behind the other or in succession, in particular along the tool axis.

In one embodiment, the at least one shank-side thread-cutting tooth or the at least two shank-side thread-cutting teeth is provided at least substantially to form the at least one countersink, and the at least one end-side thread-cutting tooth is provided at least substantially to create the through-thread.

The envelope curve and/or envelope contour are/is preferably at least substantially and/or partially conical.

In at least one embodiment, the first, preferably shank-side, thread-cutting tooth and the second, preferably shank-side, thread-cutting tooth are ground down in such a way with respect to the further thread-cutting teeth of the end and/or main cutting edges that the envelope curve and/or envelope contour of the first thread-cutting tooth forms the innermost ring of the at least one countersink with the countersink angle, and that the envelope curve and/or envelope contour of the second thread-cutting tooth forms the second-innermost ring, surrounding the innermost ring, of the at least one countersink with the countersink angle, wherein the second-innermost ring directly surrounds the innermost ring of the at least one countersink and thus preferably at least partially forms the conical countersink.

In particular, the countersinking means can be formed exclusively by the thread creation region, preferably by the thread creation means.

The thread creation means preferably forms the countersinking means. In particular, the thread can be created with the aid of the end-side thread-cutting teeth, wherein the shank-side thread-cutting teeth are not used or at least not primarily used for cutting the thread since they are ground down along their circumference. Nevertheless, depending on the depth, these thread-cutting teeth too can be used for further additional cutting of the thread flanks, as can generally be the case with rear thread-cutting teeth. Moreover, the shank-side thread-cutting teeth can also contribute to the axial guidance of the thread-cutting tap in the region of the thread flanks, again similarly to rear thread-cutting teeth.

Thus, preferably all the thread-cutting teeth, including the thread-cutting teeth forming the countersinking means, jointly form the thread creation means, wherein, in particular, all the thread-cutting teeth contribute or can contribute to the formation of the thread.

The thread-cutting teeth are preferably arranged on the end and/or main cutting edges, in particular on each end and/or main cutting edge. In particular, the thread-cutting teeth are integral with the end and/or main cutting edges.

The thread-cutting teeth are preferably arranged on the tap bodies, in particular on each tap body. In particular, the thread-cutting teeth are integral with the tap bodies.

Preferably, at least one or each end and/or main cutting edge has one or more, in particular axially successively arranged, thread-cutting teeth, which jointly form both the countersinking means and create the thread, in particular cut the thread. In one embodiment, the countersinking means is jointly formed by a plurality of, in particular axially successively arranged, thread-cutting teeth.

In particular, the thread-cutting teeth are designed in such a way along one or each end and/or main cutting edge that they form the course of the thread in the axial direction, in particular its inner flanks and/or outer flanks, over at least two thread grooves or over at least three thread grooves.

The thread creation means, in particular a plurality of thread-cutting teeth of the thread creation means jointly, preferably creates the through-thread in the screw-in movement. In this case, the thread-cutting teeth are preferably each connected integrally to a tap body and/or an end and/or main cutting edge, wherein, in particular, a plurality of thread-cutting teeth on a plurality or all of the tap bodies and/or end and/or main cutting edges jointly creates the through-thread in the screw-in movement.

The thread creation means, in particular a plurality of threads-cutting teeth of the thread creation means jointly, preferably creates the countersink in the countersinking movement. In this case, the thread-cutting teeth are preferably each connected integrally to a tap body and/or an end and/or main cutting edge, wherein, in particular, a plurality of thread-cutting teeth on a plurality or all of the tap bodies and/or end and/or main cutting edges jointly creates the countersink in the countersinking movement.

In particular, after the screw-in movement on a thread path up to the second position or end position for creating the through-thread, during which the axial position as well as the rotation angle position of the tool are moved in a manner synchronized with respect to one another at each point or in each position, the countersinking movement is carried out.

After the countersinking movement, the tool is preferably moved back into the second position or end position of the screw-in movement or at least one defined position on this thread path, so that, starting from this position, the tool can be screwed out again on the thread path, in particular the same thread path.

In one embodiment, a CNC machine and/or a machine tool, in particular with CNC control, is programmed and/or controlled in such a way that it carries out the method according to the invention, in particular the screw-in movement, the countersinking movement and the screw-out movement in immediate succession in time and/or in a mutually synchronized manner as regards the tool positions. In this way, the CNC machine and/or machine tool, in particular with CNC control, preferably moves the tool, which in turn creates the through-thread and the at least one countersink.

In one embodiment, a CNC machine and/or a machine tool, in particular with CNC control, is programmed and/or controlled in such a way that it creates the through-hole, the through-thread and the at least one countersink in one operation by means of the same tool and, for this purpose, in particular carries out a drilling movement, the screw-in movement, the countersinking movement and the screw-out movement in immediate succession in time and/or in a mutually synchronized manner as regards the tool position, preferably as regards the axial feed and rotation angle of the tool.

Such a method preferably makes possible a considerable efficiency gain in the production of a through-thread with a countersink or can make it possible, since all the production steps can be carried out in a single operation. In addition, it is possible, in particular, to improve the synchronization of the movements since the respective tool positions of the CNC machine and/or a machine tool or its control are known or can at least be known within a single operation. Preferably, the quality of the through-thread can thereby also be improved, also because the tool is screwed in and screwed out only once.

For example, the screw-in movement is first carried out by means of the tool, then a circular movement is carried out as a countersinking movement, and finally the screw-out movement is carried out. In particular, the CNC machine and/or machine tool is programmed or controlled in such a way that it carries out these movements in immediate succession in time and/or in a synchronized manner as regards the tool positions.

BRIEF DESCRIPTION OF THE DRAWINGS

The invention is explained in greater detail below by means of exemplary embodiments. Reference is also made to the drawings, in which FIGS. 1a to 1l show a combined drilling and thread creation tool during the creation of a through-threaded hole according to a first embodiment, FIGS. 2a to 2m show a combined drilling and thread creation tool during the creation of a through-threaded hole according to a second embodiment, FIGS. 3a to 3l show a combined drilling and thread creation tool during the creation of a through-threaded hole according to a third embodiment, FIG. 7 to FIG. 10 show contours of revolution which are formed by the end and/or main cutting edges or thread creation means, in each case schematically.

In FIGS. 1 to 3, mutually corresponding parts and variables are provided with the same reference signs, although not all reference signs are shown in each figure for the sake of clarity.

Figure 3F:
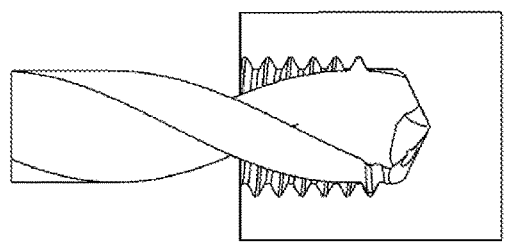
Figure 3E:
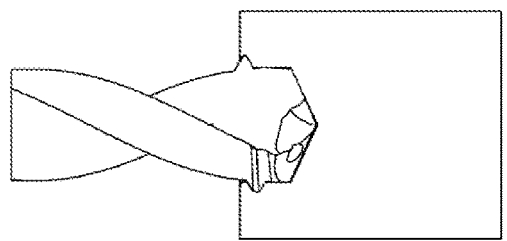
Figure 3D:
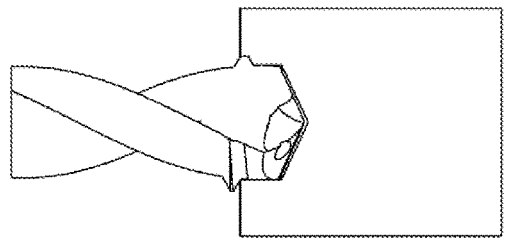
Figure 3C:
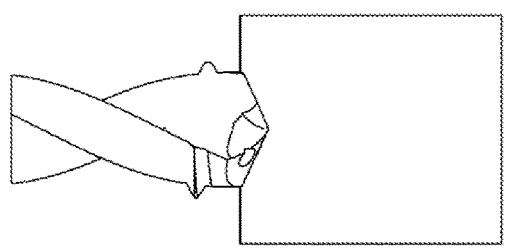
Figure 3B:
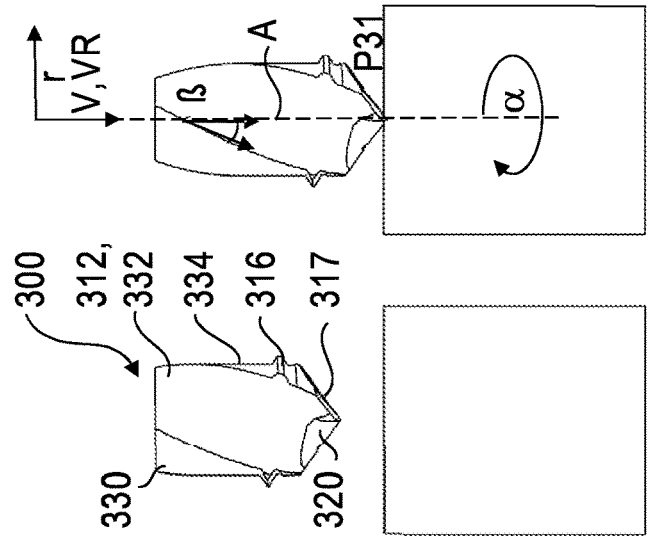
Figure 3A:
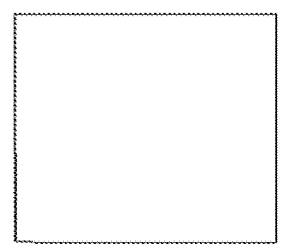

Exemplary embodiments of the tool and method according to the invention are explained below with reference to FIG. 1 to FIG. 3.

DETAILED DESCRIPTION OF THE PREFERRED EMBODIMENTS

Figure sequences 1 to 3 each show a method for creating a through-thread, in particular a through-threaded hole 163, 263, 363 with a predefined thread pitch 172, 272, 372 and with a predefined thread profile 171, 271, 371 with at least one countersink 164, 264, 364; 262 in a workpiece 150, 250, 350 by means of a tool 100, 200, 300.

The tool 100, 200, 300 can be rotated about a tool axis A extending through the tool and moved axially in relation to the tool axis, in particular by means of a turning device.

Sequentially in the direction of its end face 120, 220, 320, the tool has a shank region 211, in particular for coupling to the turning device, at least one neck region 112, 212, 312, in particular with one or two flute and/or helical flute regions, for transporting away chips, a thread creation region 116, 216, 316 with a thread creation means for creating the through-thread 163, 263, 363, and an end region 117, 217, 317 having the end face 120, 220, 320.

To create the through-thread 163, 263, 363, the thread creation means is moved in a screw-in movement in an axial forward direction VR through the workpiece 150, 250, 350 from a first position P11, P21, P31 on a first workpiece side to a second position P12, P22, P32 on a second workpiece side opposite the first workpiece side, such that the end face projects out of the workpiece at the second position P12, P22, P32, and the thread creation means is moved through the workpiece along a first line, which is a helical line.

Then, to create at least one countersink, the thread profile 171, 271, 371 is moved in a rotary movement from the second position P12, P22, P32 along a second line, which differs from the first line, to a third position P13, P23, P33 or back to the second position P12, P22, P32 in a countersinking movement.

For subsequent withdrawal, the thread creation means is moved back in an unscrewing movement from the second position P12, P22, P32, or from the third position P13, P23, P33, through the workpiece along the first line to the first position P11, P21, P31 in an axial backward direction RR.

The screw-in movement comprises a rotary movement of the tool 100, 200, 300 with a predefined direction of rotation about the tool axis A and an axial feed movement V, which is synchronized with the rotary movement according to the thread pitch 172, 272, 372, in the axial forward direction VR, axially with respect to the tool axis A, such that an axial feed of the tool by the predefined thread pitch 172, 272, 372 corresponds to a full revolution of the tool 100, 200, 300 about the tool axis A.

This takes place in such a way that the thread creation means is moved through the workpiece on a first line to create the through-thread 163, 263, 363 wherein the first line is a helical line.

In the embodiment according to FIGS. 3a to 3l, the second line comprises a second helical line in the axial forward direction VR and/or the backward direction RR, such that less than an axial feed of the tool by the predefined thread pitch 372 corresponds to a full revolution of the tool 300 about the tool axis A.

In the embodiments according to FIG. 1a to 1l and 2a to 1m, the second line comprises or is a circular movement with an at least substantially constant axial feed.

The thread creation region comprises the thread creation means 116, 216, 316, which is arranged in particular at and/or near the end face 120, 220, 320, wherein the thread creation means comprises a thread groove, in particular exactly one thread groove. The thread creation means is interrupted by at least one flute.

The thread creation means 116, 216, 316 has at least one thread tooth, in particular a plurality of thread teeth, which is/are designed and arranged to match the predefined thread pitch. The thread creation means 116, 216, 316 furthermore has an effective profile which corresponds to the thread profile of the through-thread, wherein, in particular, the at least one thread tooth cuts the thread into the workpiece.

The at least one thread tooth is moved through the workpiece on the helical line during the screw-in movement.

The neck region 212, 214 according to FIGS. 2a to 2m has a first neck region 212 and, in the direction of the end region 217, a second neck region 214.

The first neck region 212 has a first neck diameter and the second neck region 214 has a second neck diameter. In this embodiment, the first neck diameter is larger than the second neck diameter.

A first conical region 215 is arranged between the neck region 214 and the thread creation region 216. A second conical region 213 is arranged between the first neck region 212 and the second neck region 214.

The first conical region 215 widens the neck diameter of the tool in the direction of the end face, and the second conical region 213 tapers the neck diameter of the tool 200 in the direction of the end face.

The end region 117, 217, 317 comprises a drilling region for drilling a through-hole.

The drilling region comprises at least two end and/or main cutting edges, wherein a guide region 218 is formed on the outer sides thereof according to FIG. 2a. In particular, the guide region 218 can be of cylindrical design. In particular, the two end and/or main cutting edges each interrupt the guide region 218.

The second neck region 214 has a smaller diameter than the guide region 218 of the drilling region.

In particular, the second neck region 214 has a smaller diameter than the thread creation region 216.

The through-hole, the through-thread and the at least one countersink 164, 264, 364 are created in one operation by means of the same tool 100, 200, 300, in particular by means of a feed movement in the forward direction VR on the helical line, a countersink 164, 264, 364 directly following this and a backward movement, directly following this, in the backward direction RR on the helical line.

From the at least one neck region 112, 212, 312 as far as the end face 120, 220, 320, exactly two, exactly three, at least two or at least three tap bodies 130, 230, 330; 134, 234, 334 extend parallel to the tool axis A or spirally with a twist angle 3 about the tool axis A, and are separated from one another by flutes 132, 232, 332.

The flutes extend from the end and/or main cutting edges through the thread creation region 116, 216, 316 and the at least one flute or neck region 112, 212, 312, thus enabling chips to be transported away rearward from the end and/or main cutting edges.

A first countersinking means comprises the first conical region 215 and/or the thread creation region 116, 216, 316. In the embodiment according to FIGS. 2a to 2m, the first conical region 215 merges directly into the thread creation region 216.

In the embodiment according to FIGS. 1a to 1l, the countersinking means is formed exclusively by the thread creation region 116.

In the embodiment according to FIGS. 2a to 2m, a first countersinking means is formed by the first conical region 215 on the tool 200. A second countersinking means is formed by the second conical region 213 on the tool 200.

In the embodiment according to FIGS. 2a to 2m, the distance between the first and second countersinking means corresponds substantially to the thickness of the workpiece 250.

During the creation of the through-thread 163, 263, 363, a through-hole is simultaneously produced by means of the tool 100, 200, 300 during the screw-in movement. In an alternative embodiment (not illustrated), a through-thread is created in an already existing through-hole.

The first position P11, P21, P31 is arranged at an entry point to the workpiece and the second position P12, P22, P32 is arranged at an exit point from the workpiece.

In the embodiment according to FIGS. 1a to 1l, the countersinking movement is a circular movement by means of which a countersink is produced on the second workpiece side by means of a first countersinking means.

In the embodiment according to FIGS. 2a to 2m, the countersinking movement is a circular movement by means of which a first countersink is produced on the second workpiece side by means of a first countersinking means 216 and a second countersink is produced on the first workpiece side by means of a second countersinking means 213.

The tool axis A of the tool 100, 200 is deflected by a predefined radius r from the thread center axis M during the circular movement, and the tool is moved on a circular path with the predefined radius r about the thread center axis M, wherein the tool is additionally rotated about its tool axis A.

In the embodiment according to FIGS. 2a to 2m, the countersink is conical, with a maximum diameter which is greater than the maximum diameter of the thread profile.

In the embodiment according to FIGS. 1a to 1l, the countersink creates a chamfer on the second workpiece side 152 at the end of the through-thread.

In the embodiment according to FIGS. 2a to 2m, the countersink creates a chamfer, in particular on the first workpiece side 251 and on the second workpiece side 252 and thus at the start and end of the through-thread.

In the embodiment according to FIGS. 3a to 3l, the countersinking movement is a circular movement along a circular line by means of which a cylindrical countersink is produced on the second workpiece side 351 by means of the first countersinking means 316.

In the embodiment according to FIGS. 3a to 3l, the countersinking movement is a non-helical movement by means of which a countersink is produced on the second workpiece side.

The feed is at least temporarily reduced during the countersinking movement in the embodiments according to FIGS. 1a to 1l and 2a to 2m, in particular in such a way that the feed during one revolution of the tool is less than the predefined thread pitch.

In the embodiment according to FIGS. 3a to 3l, the feed is at least temporarily reduced during the countersinking movement, in particular in such a way that the feed during one revolution of the tool is zero.

The countersinking movement takes place in the forward direction VR and/or in the backward direction RR.

To create the countersink, the end face can be moved from the second position P12, P22, P32 to the third position P13, P23, P33 in the forward direction, and the second and third positions each lie on the helical line.

To create the countersink, the end face can be moved from the second position P12, P22, P32 to the third position P13, P23, P33, also or partially in the backward direction, and the second and third positions each lie on the helical line.

To create the countersink, the end face can furthermore be moved in the forward direction from the second position P12, P22, P32 to the third position P13, P23, P33 and then in the backward direction again to the second position.

In the embodiment according to FIGS. 1a to 1l, the countersink is cylindrical, with a diameter which is greater than the maximum diameter of the thread profile.

In the embodiment according to FIGS. 3a to 3l, the countersink is cylindrical, with a diameter which is equal to the maximum diameter of the thread profile.

In the embodiments according to FIGS. 1a to 1l and FIGS. 3a to 3l, the countersink is created on the second workpiece side 152, 352 and thus at the end of the through-thread.

In the embodiment according to FIGS. 2a to 2m, a first countersink is created on the first workpiece side 251 and thus at the start of the through-thread and a second countersink is created on the second workpiece side 252 and thus at the end of the through-thread.

At least one feed V and one rotation angle α are assigned to each position P11-P13, P21-P23, P31-P33 of the tool 100.

A position P11-P13, P21-P23, P31-P33 is defined by a rotation angle α, a linear displacement V in the axial direction and, in particular, a radial deflection r of the tool 100, 200, 300 with the tool axis A from the thread center axis M.

Figure sequences 1 to 3 each show a tool, in particular for carrying out the method according to the invention, having an end face, comprising sequentially in the direction of the end face 120, 220, 320 thereof
- a shank region 211 (shown only in figure sequence 2), in particular for coupling to the turning device,
- at least one neck region 112, 212, 312, in particular with one or two flute and/or helical flute regions, for transporting away chips,
- a thread creation region 116, 216, 316 with a thread creation means for creating the through-thread 163, 263, 363, and
- an end region 117, 217, 317 having the end face 120, 220, 320.

The tool for carrying out the method can comprise a thread-forming tap or a thread-cutting tap and/or a drill.

The turning device is or preferably comprises a CNC machine and/or a machine tool, in particular with CNC control.

In respect of the embodiment according to FIG. 3, further details for a possible variant of a method according to the invention for creating a through-thread are described below by way of example.

During the screw-in movement as the first working phase or thread creation phase, the through-hole is created using the tool 300 by means of the end region, and the thread groove in the hole wall is produced immediately axially behind it and at least in part simultaneously by means of the thread creation means. In this first working phase, the axial feed rate along the tool axis A is matched to the speed of rotation for the rotary movement about the tool axis A and synchronized in such a way that, during a full revolution, the axial feed corresponds to the thread pitch P or 372. The axial thread depth in the direction of the tool axis A, measured from the workpiece surface, in this first working phase is designated by $T_G$.

In a braking movement as the second working phase immediately following the first working phase, the tool 300 is then braked in a braking process (or: in a braking movement) in a rotation angle interval in such a way that the axial feed V at a rotation angle of 360°, i.e. at a full revolution, of the tool is less than the thread pitch P or 372 and decreases to zero. As a rule, the braking process or the second working phase begins with an axial feed, based on a rotation angle of 360°, which corresponds to the thread pitch P of the first working phase, that is to say V=P, and then reduces the axial feed per 360° rotation angle to values below the thread pitch P, that is to say V<P. The braking process is to be understood as braking from the initial thread pitch V=P to zero at the end or at a reversal point, that is to say V=0, and does not have to include a reduction in the axial feed V as a function of the rotation angle (braking acceleration) over the entire rotation angle interval. On the contrary, rotation angle intervals in which the axial feed in relation to the rotation angle is zero or is even temporarily negative, that is to say its direction is reversed, are also possible.

In a preferred embodiment, this braking process takes place in defined partial steps, as will be explained in greater detail in the following.

In a manner which is in fact atypical or foreign to the mode of operation, this braking movement in the second working phase leads to the thread creation means now creating at least one encircling groove or peripheral groove or circumferential groove in the through-hole wall. The process in the second working phase may therefore also be referred to not only as a braking process but also as a countersinking movement or circumferential groove creation or peripheral groove creation or undercut movement, and, in the case of a tool with a purely cutting action, also as a free-cutting movement.

In the screw-out movement as the second reversing phase of the backward movement RB, following the first reversing phase of the acceleration movement BB, the axial feed and the rotary movement of the tool 300 are again synchronized with one another in accordance with the thread pitch P or 372 in order not to damage the thread, except that in each case the direction of the axial feed in the direction of the arrow of the backward movement RB is reversed or opposite to the direction of the arrow of the forward or working movement VB, and the direction of rotation of the rotary movement is likewise reversed, that is to say the backward direction of rotation is now set instead of the forward direction of rotation.

The thread axis or center axis of the thread with the thread groove 371 is designated by A and coincides with or is coaxial with the tool axis A of the tool 300 during the entire working movement, that is to say both in the first working phase and in the second working phase, and also during the reversing movement, that is to say both in the first reversing phase and in the second reversing phase.

Figure 4:
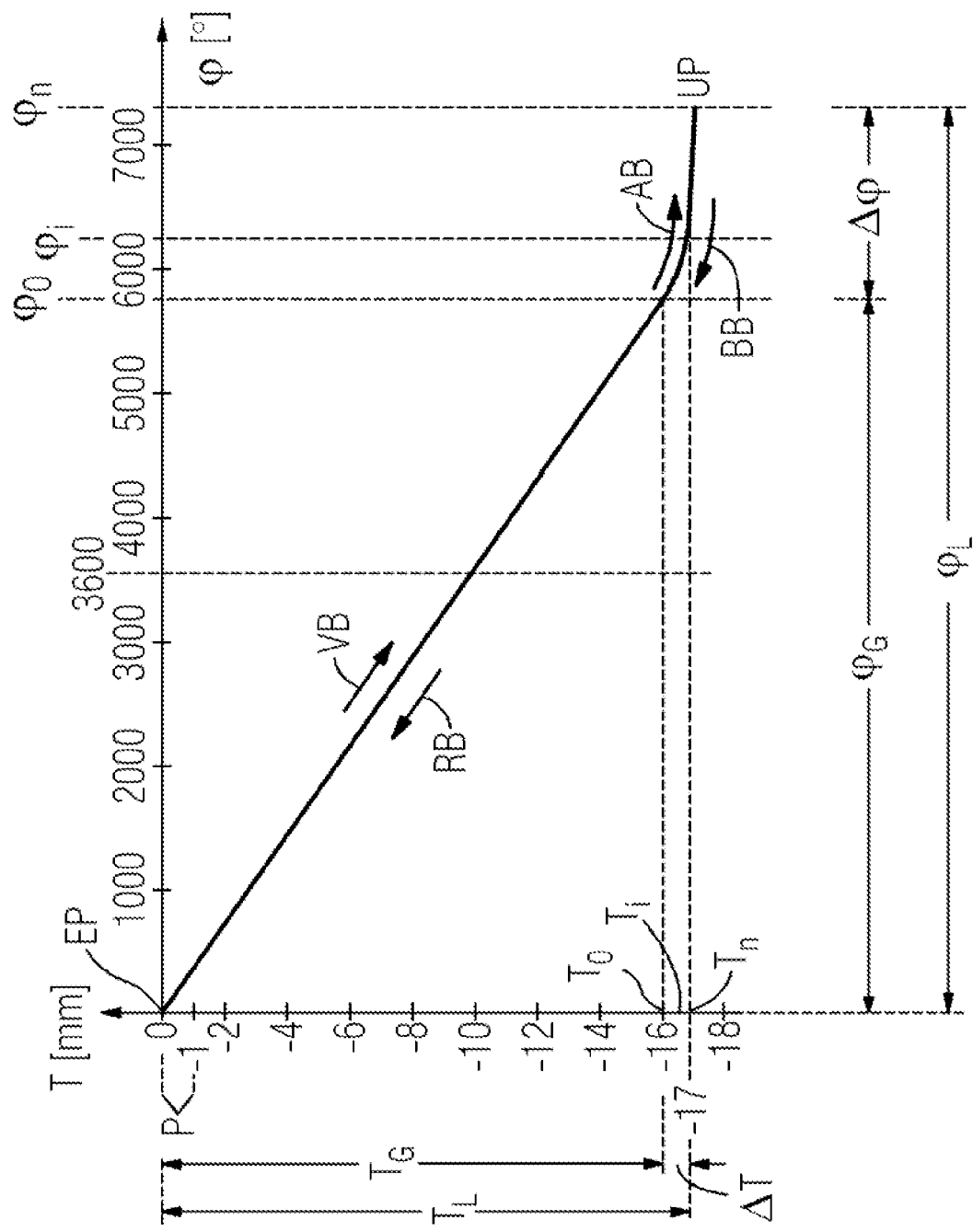
FIG. 4 shows in a diagram the graph of the axial penetration depth as a function of the rotation angle for an entire threaded hole creation cycle.
Figure 5:
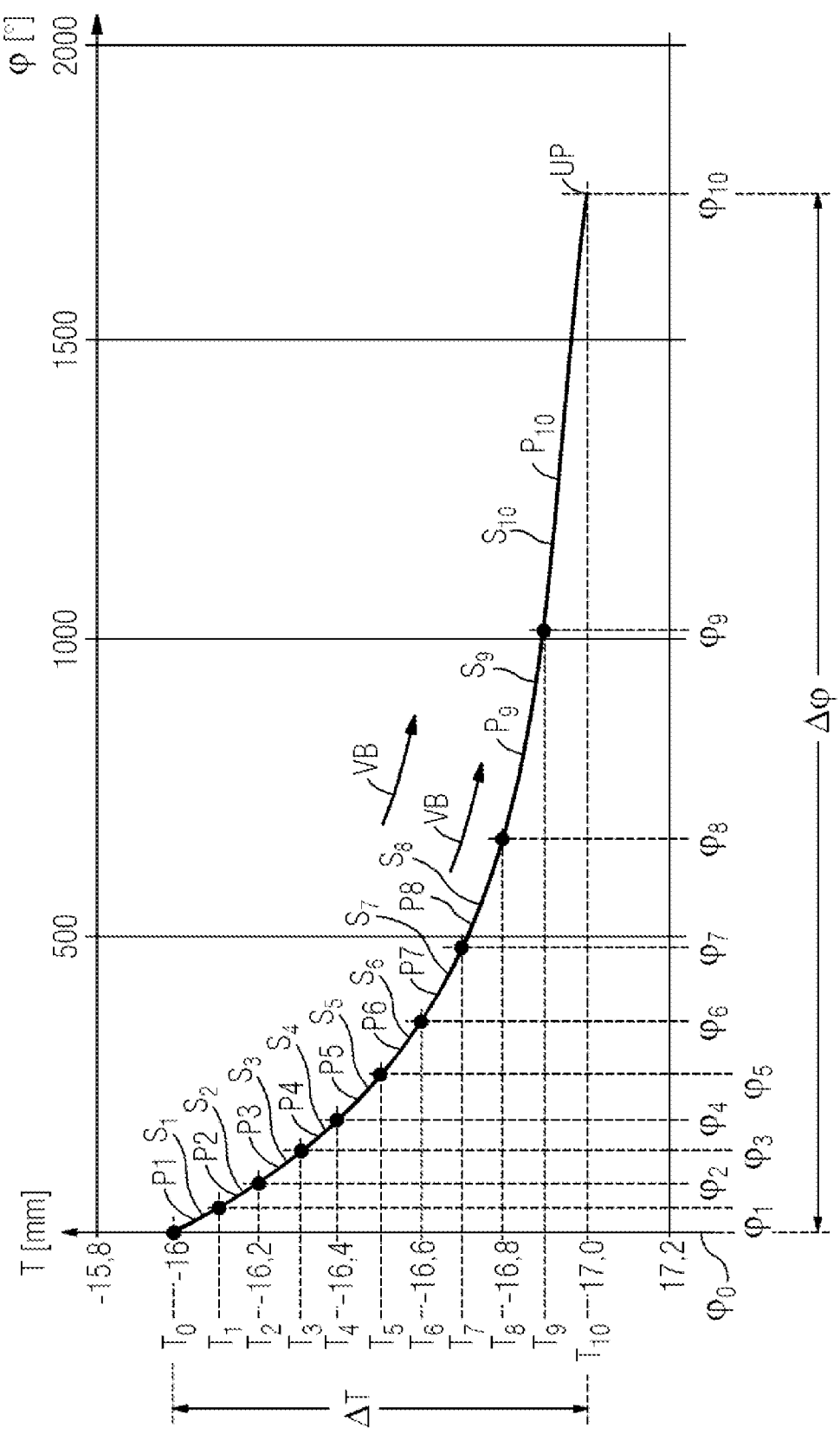
FIG. 5 shows the end section of the graph illustrated in FIG. 4 in the forward movement as a braking process.
Figure 6:
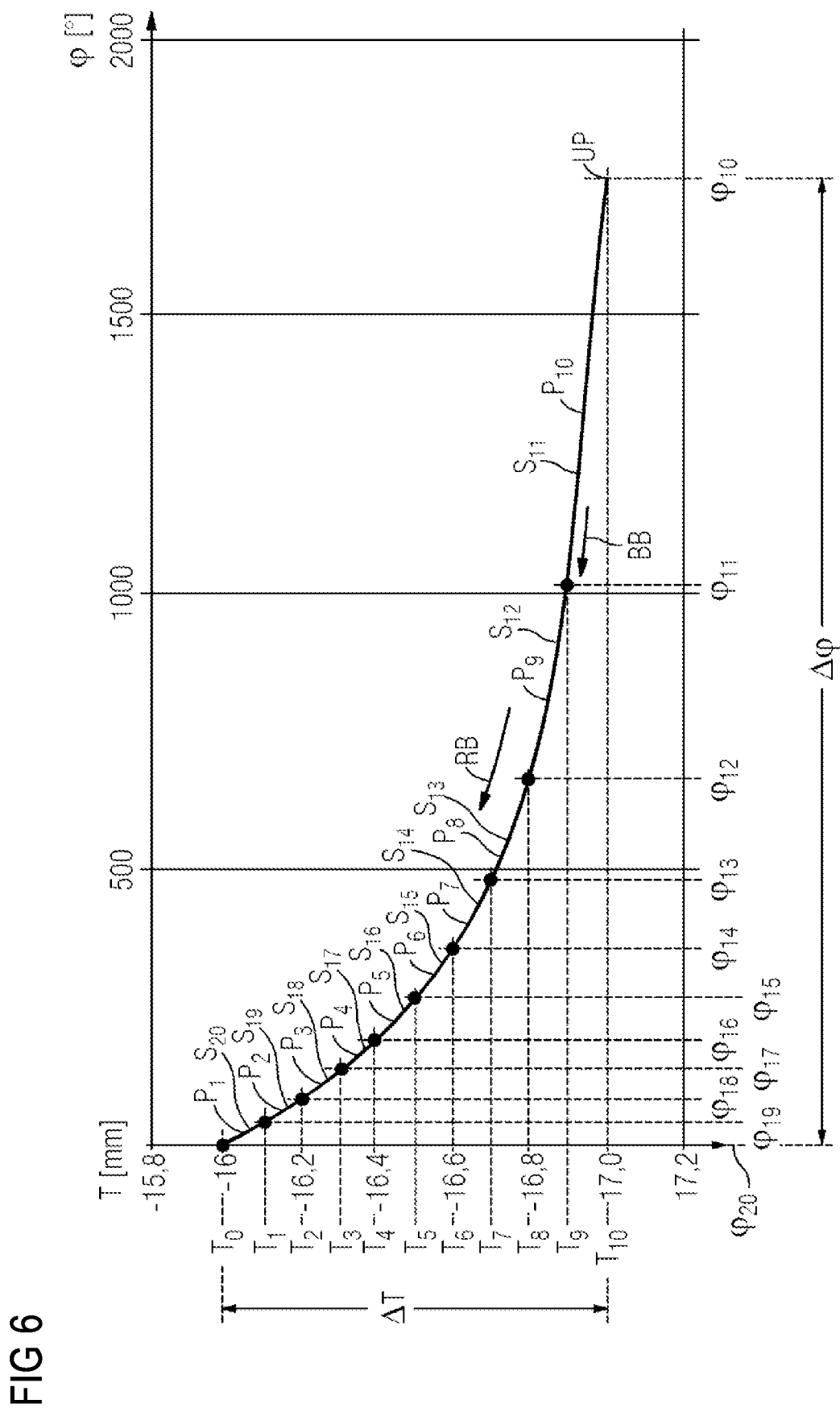
FIG. 6 shows the end section of the graph illustrated in FIG. 4 in the backward movement as an acceleration process.

FIGS. 4 to 6 each show, on the basis of a diagram, an exemplary embodiment of a process (or: method) or of a control sequence, which can be used both to create a thread in a previously created through-hole in the workpiece or to create a through-threaded hole in the workpiece, that is to say in the solid material of the workpiece without previous core drilling.

To create a thread in a preproduced through-hole, a thread-cutting tap or thread-forming tap according to the prior art mentioned at the outset can be used.

A combined drilling and thread-cutting tool, as known from DE 10 2016 008 478 A1 mentioned at the outset, or a combined drilling and thread-forming tool, as known from DE 10 2005 022 503 A1 mentioned at the outset, or a tool according to the invention, for example according to FIGS. 1 to 3, can be used to create a threaded hole.

In the diagram of FIG. 4, the penetration depth (or: vertical or axial coordinate) T is plotted on the vertical axis or ordinate as a measured coordinate for the axial feed in mm, which coordinate extends in the axial direction, that is to say along the tool axis A and the thread center axis, which is coaxial with the tool axis A. The values for the penetration depth T decrease downward from the value T=0 mm illustrated at the very top, which corresponds to the axial entry position at the workpiece surface of the workpiece 300 (as can be seen in FIGS. 1 to 3), and are therefore plotted downward as negative values. In the example of FIG. 3, by way of example, the numerical range is from T=0 mm to T=−18 mm.

The (summed) rotation angle φ of the rotary movement of the tool 300 about its tool axis A is plotted in degrees [°] on the horizontal axis or abscissa. The rotation angle φ starts from the entry rotation angle or initial rotation angle φ=0° at the axial entry position T=0 mm at an entry point EP=(0, 0) and increases to the right toward positive values, up to the value of φ=8000° entered as the last value on the abscissa. The rotation angle φ increases toward positive values during the forward rotational movement or in a forward direction of rotation, and decreases during the backward rotary movement or in a backward direction of rotation opposite to the forward direction of rotation. In this case, ±360° corresponds to a complete revolution of the tool 300 about its tool axis A.

The graph of the function T (φ) according to FIG. 4 illustrates, in particular, the creation of a through-threaded hole, that is to say a complete threaded-hole creation cycle according to the invention, in an exemplary embodiment, without limiting generality.

The function T (φ) describes the dependence or synchronization of the axial feed movement in the axial coordinate (or: thickness of the workpiece) T on or with the rotary movement in the coordinate φ and is typically stored in a controller such as a numerical controller or CC controller of the machine tool, in particular in the form of a previously determined and stored value table or, alternatively, as a function for calculation in each case. According to the nomenclature customary in CNC technology, the T coordinate would correspond to the Z axis (spindle axis), where the positive direction is conventionally from the workpiece to the tool.

According to FIG. 4, the graph (φ;T (φ)) of the function T (φ) first runs through a linear segment typical of a thread-cutting tap or thread-forming tap and corresponding to the creation of the thread groove, i.e. in the form of a straight line, from the starting point φ=0° and T=0 mm to a thread end point at φ$_0$ and T(φ$_0$)=−16 mm, at which the thread groove or the actual creation of the thread ends.

Thus, the representation of the linear function T (φ) in this segment from φ=0 to φ=φ$_0$ and T=0 to T=−16 mm applies:

$$|T(\varphi)|=(P/360°)\varphi$$

with the thread pitch P.

The pitch or derivative $dT/d\varphi$ in this region is constant and corresponds in absolute terms to P/360°. For the thread pitch, this means therefore $$P=360° \; |dT/d\varphi|$$

Since, in the selected example of FIG. 4, the value for the thread depth corresponding to the entered angular value φ=3600° is T=−10 mm, the slope of the straight line is −1 mm/360° and thus the thread pitch is P=1 mm.

Owing to the axial feed along the workpiece thickness T or the thread center axis M being synchronized with the rotation, all the components of the tool 300 have traveled further by the thread pitch P or 372 during one complete revolution through 360°.

The linear segment of the function T (φ) corresponds to the usual synchronized kinematics of a thread-cutting tap or thread-forming tap and can be stored in a CNC controller, for example as an already fixedly programmed path condition (address letter G or G function), e.g. as G33, in particular G331 and G332, the thread pitch P being entered as an interpolation parameter parallel to the Z axis, typically under the address letter K in CNC nomenclature.

It is in this linear segment, that the thread creation process takes place, in particular to create the thread groove 371 in the first working phase according to FIG. 3, and a thread of thread depth T$_G$ is produced as the interval length of the penetration depth T, in particular from T=0 to T$_0$, over the interval length or the rotation angle range φ$_G$ of the rotation angle φ, in particular from φ=0° to φ=φ$_0$. In the example of FIG. 4, the thread creation process (first working phase) takes place from φ=0° to φ=φ$_0$ and from the corresponding penetration depth T=0 mm to T=−16 mm.

The slope of the straight line in FIG. 4 between φ=0 and φ=φ$_0$ corresponds to the axial feed rate of the tool 2, which is synchronized with the rotation angle φ in accordance with the thread pitch P.

It is possible, in principle, for the time dependence of the rotation angle φ(t) as a function of time t and thus penetration depth T(t) as a function of time t to be varied during the thread creation process, even within wide ranges. Preferably, however, the speed of rotation dφ/dt and the axial feed rate dT/dt are in each case constant during the working movement VR. When the speed of rotation dφ/dt is changed, the axial feed rate dT/dt, that is to say the derivative of the penetration depth T with respect to time t, must therefore also be correspondingly adapted to ensure that the synchronization of the axial feed Z in accordance with the relationship Z=P/360° is maintained.

This is the known kinematics implemented in machine tool controllers or CNC controllers during thread creation by means of an axially operating threading tool such as a thread-cutting tap or thread-forming tap.

Following the thread creation process (first working phase), a braking process or a braking movement AB then takes place, in particular in the countersinking movement as the second working phase, in a rotation angle range $\Delta_\varphi$ between the rotation angle values φ$_0$ and φ$_n$, and an associated penetration depth range ΔT, which, in the example in FIG. 4, extends from T(φ$_0$)=−16 mm to T(φ$_n$)=−17 mm. At the end of the braking movement AB, a reversal point UP is reached, at which the tool 300 comes to a brief stop both in terms of the rotary movement and in terms of the axial feed movement. At the reversal point UP, the maximum rotation angle range φ$_L$ for the creation of the threaded hole is reached, where φ$_L$=φ$_G$+Δφ, and the depth T$_L$ for the threaded hole, where T$_L$=T$_G$+ΔT.

During the braking process or the braking movement AB, the axial feed rate is reduced as a function of the rotation angle, said feed rate corresponding to the slope of the illustrated graph for the function T(φ), in accordance with a dependency or function which is preferably strictly monotonic (slope always decreasing) or monotonic (slope decreasing and, if appropriate, also zero in some segments), but, if appropriate, may also rise slightly again in some subsegments. Preferably, the slope is successively reduced in a predetermined number n of individual defined programmed or stored partial steps or braking steps S$_i$, wherein the total number or number n is a natural number with n>1, in general 200>n>2, in particular 20>n>5, and wherein i is the count index for the braking step S$_i$ and is between 1 and n, i.e. 1≤i≤n.

In each partial step or braking step S$_i$, a synchronization of the axial feed T (or of the feed rate dT/dt) and the rotation angle φ (or speed of rotation dφ/dt) in accordance with the control of a threading process is set or programmed in that an associated predetermined function T$_i$ (φ) with an associated value interval $[T_{i-1}, T_i]$ over the associated rotation angle interval $[(\varphi_{i-1}, \varphi_i]$ is assigned or programmed to each braking step $S_i$ where $1 \leq i \leq n$.

The function $T_i(\varphi)$ is preferably linear, that is to say the graph is (ideally) a straight line.

In this case, the programmed or stored slope decreases stepwise or successively from one braking step $S_i$ to the next braking step $S_{i+1}$, i.e. $|dT_i/d\varphi| > |dT_{i+1}/d\varphi|$. The slope in each case corresponds to a pitch parameter.

In an advantageous embodiment, this pitch parameter is programmed as a thread pitch in the CNC controller, that is to say in particular as an interpolation parameter along the z axis or the thread axis in a G33, in particular G331 and G332, path condition. As a result, it is possible to use the path conditions or G functions already specified in the control programming, and only the input parameter of the thread pitch has to be successively changed or reprogrammed.

Thus, in each braking step $S_i$, the associated pitch parameter $$P_i = |dT_i/d\varphi|$$

is programmed or set, wherein $$P_{i+1} < P_i$$

for all i with $1 \leq i \leq n$. Furthermore, $$P_i < P$$

i.e. the pitch in the second working phase or during the braking movement AB is less than the thread pitch P during the first working phase. In particular, however, without limiting generality, $P_i = P(n-i)/n$ is possible. This applies, for example, for $P_1$ to $P_{n-1}$, wherein a value smaller than $P_{n-1}$, e.g. $P_{n-1}/2$, is then selected for $P_n$.

In particular, $P_1$ is chosen to be as close as possible to P. Furthermore, in particular $P_n > 0$ and is chosen to be as close as possible to 0.

The values of $P_i$ can be selected in such a way, for example, that a continuous movement into the free-cutting region is possible from the thread pitch movement. In particular, the speed of the tool should be maintained as far as possible. From this, various conditions can be formulated, for example, which can be mapped into approximation functions.

In each braking step $S_i$, the following relationship holds for all i with $1 \leq i \leq n$:

$$T(\varphi) = T_{i-1} - (P_i/360°)(\varphi - \varphi_{i-1})$$

for $\varphi \in [\varphi_{i-1}, \varphi_i]$ with the boundary conditions $T(\varphi_{i-1}) = T_{i-1}$ and $T(\varphi_i) = T_i$.

The rotation angle range $\Delta\varphi$ for the braking movement AB in the second working phase is generally selected to be smaller than the rotation angle range $\varphi_G$ for thread creation in the first working phase, in particular $\Delta\varphi < 0.5\ \varphi_G$ and preferably $\Delta\varphi < 0.2\ \varphi_G$ is selected. This can depend, in particular, on the size of the usable thread length. Another influencing factor is the intended free-cutting function. If, in addition to pure braking, the intention is also to make further rotations for cutting free the chips, further revolutions can be added.

The penetration depth range (or: the maximum penetration depth) $\Delta T$ for the braking movement AB in the second working phase is generally selected to be smaller than the penetration depth range or the thread length $T_G$ for thread creation in the first working phase, in particular $\Delta T < 0.5\ T_G$, preferably $\Delta T < 0.2\ T_G$.

The penetration depth range $\Delta T$ for the braking movement AB can, in particular, be selected to be equal to P. Likewise, a penetration depth range $\Delta T$ of less than P is possible in order to keep the countersink or undercut smaller, for example 0.5 P or else 0.25 P. For reasons of machining, it may also be advantageous to select larger undercut heights or a larger penetration depth range $\Delta T$, in particular up to 2 P and, in exceptional cases, even larger.

FIG. 5 now shows an exemplary embodiment of a braking movement AB in an enlarged view of the lower right-hand region of the diagram of FIG. 3 in a rotation angle range $\Delta\varphi$ and an associated penetration depth range $\Delta T$.

By way of example and without limiting generality, n=10 is selected in FIG. 5, and ten braking steps $S_1$ to $S_{10}$ with the associated pitch parameters $P_1$ to $P_{10}$ are thus shown.

The rotation angle range $\Delta\varphi$ is accordingly divided into the n=10 rotation angle intervals $[\varphi_0, \varphi_1], [\varphi_1, \varphi_2], \ldots, [\varphi_{i-1}, \varphi_i], [\varphi_i, \varphi_{i+1}], \ldots [\varphi_9, \varphi_{10}]$ and, associated with these intervals, the corresponding penetration depth intervals $[T_0, T_1], [T_1, T_2], \ldots, [T_{i-1}, T_i], [T_i, T_{i+1}], \ldots, [T_9, T_{10}]$, into which the penetration depth range $\Delta T$ is divided, which in the example of FIG. 4 extends from $T(\varphi_0) = -16$ mm to $T(\varphi_{10}) = -17$ mm and/or corresponds to the thread pitch—P=-1 mm. A partial step $S_i$ corresponds to each interval.

In FIG. 5, unlike in FIG. 4, the differential rotation angle is plotted starting from $\varphi_0$. If the intention is to enter the same values for $\varphi$ on the rotation angle axis in FIG. 5 as in FIG. 4, then all the values on the horizontal axis must be added to the value of po, which in FIG. 4 is 5800°, for example. The braking movement AB begins at the rotation angle value $\varphi_0$ and the associated penetration depth value $T_0$ and ends at the final rotation angle value $\varphi_{10}$ and the associated penetration depth value $T_{10}$.

An associated pitch parameter $P_i$, in particular in the form of a thread pitch or interpolation parameter of the CNC controller, is now assigned to each of these intervals of each braking step $S_i$, that is to say the pitch $P_1$ to the two intervals $[\varphi_0, \varphi_1]$ and $[T_0, T_i]$, the pitch $P_2$ to the interval pair $[\varphi_1, \varphi_2]$ and $[T_1, T_2]$ and so on as far as the pitch $P_{10}$ for the last interval pair $[\varphi_9, \varphi_{10}]$ and $[T_9, T_{10}]$.

The pitch values $P_1$ to $P_{10}$ are selected in such a way that $P_{i+1} < P_i$ for i=1 to i=10 in FIG. 5 or n in FIG. 4. In each subsegment or braking step $S_i$, the thread pitch $P_1$ to $P_{10}$ remains constant, resulting in substantially straight subsegments of the graph of the function $T(\varphi)$, in which a synchronized "thread movement" takes place, that is to say the axial feed rate corresponds to the quotient of $P_i/360°$.

In the exemplary embodiment illustrated in FIG. 5, the penetration depth intervals in the braking steps $S_i$ were selected to be of equal size for all i with $1 \leq i \leq n$ (in this case, for example, n=10), so that the length of the intervals $T_1 - T_0 = T_2 - T_1 = T_i - T_{i-1} = T_{i+1} - T_i = T_n - T_{n-1}$ is selected to be equal or equidistant, i.e.

$$T_i - T_{i-1} = \Delta T/n$$

in the illustrated exemplary embodiment of FIG. 5, is selected as $-1$ mm$/10 = -0.1$ mm.

Since the axial feed is selected to be constant in each subsegment or subinterval in the exemplary embodiment of FIG. 5 since $T_{i+1} - T_i$ is selected to be equal or equidistant for all i, as the pitch $P_i$ becomes smaller and thus the axial feed rate decreases, there are greater rotation angle intervals $\varphi_{i+1} - \varphi_i$ $$\varphi_{i+1} - \varphi_i > \varphi_i - \varphi_{i-1}$$

in the rotation angle range $\Delta\varphi$ in the braking steps $S_i$. That is to say that the rotation angle distance $\varphi_2 - \varphi_1$ is smaller than the rotation angle distance $\varphi_3-\varphi_2$, and the rotation angle distance $\varphi_{i+1}-\varphi i$ is larger than the angular distance $\varphi_i-\varphi_{i-1}$. The last subsegment between the rotation angle values $\varphi_{10}-\varphi_9$ covers the largest angular distance or angular range. This corresponds to a continuous braking process which is slowed down in each subsegment or braking step $S_i$.

During the braking movement AB, the time dependence of the speed of rotation $d\varphi/dt$ and the axial feed rate $dT/dt$ are selected or controlled or programmed in such a way that the tool 300 comes to rest at the reversal point UP=$(\varphi_n, T_n)$ or $(\varphi_{10}, T_{10})$, that is to say $d\varphi/dt=0$ and $dT/dt=0$ at $\varphi=\varphi_n$ or $T=T_n$ or at $\varphi=\varphi_{10}$ or $T=T_{10}$.

The reduction of the speed of rotation $d\varphi/dt$ and of the axial feed rate $dT/dt$ to 0 as a function of the time t can take place, for example, continuously during the braking movement AB or even, for example, only in the last braking step $S_n$ or $S_{10}$.

The curves of the graphs in braking steps $S_1$ to $S_{10}$ of FIG. 5, which are in reality not exactly linear but somewhat rounded, follow physically from the inertia of the drive system, in particular of the controller, including its interpolation routines for smoothing the transitions, and of the machine drives and the mass inertia of the moving components.

However, when shown in an idealized manner or stored in the programming of the braking movement itself, the described sequence of linear functions or linear segments arranged in series with a slope decreasing in steps, i.e. a feed rate which decreases in steps and is respectively constant, is obtained in the individual braking steps $S_i$, e.g. $S_1$ to $S_{10}$.

Before initiating a retraction or reversing movement, an intermediate step, such as a cleaning process, may optionally be carried out. Here, for example, chip root residues can be removed by further rotation of the tool or the circumferential groove can be cleaned of residues of the thread tips in order to obtain a cleaner cylindrical region. A screw could then be screwed in even better.

In one embodiment, as shown in particular in FIG. 4 and FIG. 6, after the reversal point UP is reached, a reversing movement or backward movement RB is then initiated, which initially comprises an acceleration movement BB in a first reversing phase up to introduction into the thread groove and, in a second reversing phase, a backward movement RR, in which the tool 300 is extracted outward in a manner synchronized by the thread groove.

In an advantageous embodiment, the control curve or function according to FIG. 4 can be used or traversed in the reverse order.

The rotary movement is reversed for the backward movement from the forward direction of rotation to the backward direction of rotation, i.e. the rotation angle $\varphi$ is preferably reduced, starting from $\varphi=\varphi_n$ or $\varphi=\varphi_{10}$ at the reversal point UP or is rotated back in the negative direction until finally the initial value p=0 is reached again and the tool 300 emerges from the workpiece. The dependence or function $T(\varphi)$, which is preferably assumed unchanged, then leads to the penetration depth T becoming smaller in terms of magnitude as the rotation angle decreases, that is to say decreasing again from $T=T_n$ or $T=T_{10}$ at the reversal point UP to T=0 at the entry point EP at $\varphi=0$, which is thus at the same time also the exit point. In particular, the first reversing phase corresponds to the second working phase and the second reversing phase corresponds to the first working phase.

In particular, it is also possible to use an embodiment for the second working phase, such as, for example, according to FIG. 5, in reverse order for the first reversing phase.

FIG. 6 shows an exemplary embodiment of how, in the first reversing phase, starting from the reversal point UP, the same dependency or function $T(\varphi)$ can be used in the opposite order for the acceleration movement BB in reversal of the braking movement AB, for example according to FIGS. 4 and 5.

However, it is also possible to use other functions $T(\varphi)$ and partial steps than in FIG. 6 which preferably lead back to the point $(\varphi_0, T_0)$ at which the braking movement AB also began or the first working phase ended, thus enabling the correct introduction point for the tool to be reached for the return movement through the thread groove.

Preferably, in reverse order starting from the final angle value $\varphi_n$ or $\varphi_{10}$, an acceleration phase is first carried out as the first reversing phase with an acceleration movement BB with the same incremental steps. However, these steps are now acceleration steps $S_j$ with $n+1 \le j \le 2n$, in FIG. 5 starting with $S_{11}$ to $S_{20}$ for n=10.

Associated with each of these acceleration steps $S_j$ is an associated rotation angle interval $[(\varphi_{10}, \varphi_{11}], [\varphi_{11}, \varphi_{12}], \ldots, [\varphi_{j-1}, \varphi_j], [\varphi_j, \varphi_{i+1}], \ldots [\varphi_{19}, \varphi_{20}]$, where p from the first reversal phase simply corresponds to ei from the second working phase if i+j=n is set. The pitch parameters likewise remain the same, only in the reverse order, i.e. in FIG. 6 they are traversed from right to left from $P_{10}$ via $P_9$ and $P_8$ to $P_1$ for the subsegments of the control curve according to FIG. 5, until the depth value $T_0$ is reached. According to FIG. 6, the new angle value $\varphi_{11}$ is assumed later in time than angle value $\varphi_{10}$, and the interval $[\varphi_{10}, \varphi_{11}]$ corresponds to the interval $[T_{10}, T_9]$ with the thread pitch $P_{10}$, and the subsequent angle interval $[\varphi_{11}, \varphi_{12}]$ corresponds to the penetration depth interval $[T_9, T_8]$ with the corresponding thread pitch $P_9$, etc., up to the last subsegment of $[\varphi_{19}, \varphi_{20}]$ corresponding to $[T_1, T_0]$ with the thread pitch $P_1$.

Subsequently, in the reverse direction to FIG. 4, the linear segment of the curve is traversed from $\varphi_0$ to $\varphi=0$, corresponding to the penetration depth T from $T_0$ to T=0. The corresponding axial feed rate in the backward movement is now again P/360° in the opposite direction. As a result, the tool is guided precisely the other way round through the thread created in the forward movement, without damage to the thread groove created occurring in the thread. The backward movement is thus synchronized exactly as the forward movement, only with the reverse direction of rotation, with the result that the value $\varphi$ of the angle $\varphi_n$ just decreases backward again to $\varphi=0$, and the thread depth now increases mathematically from $T=T_0$ to T=0, even though the axial feed rate is reversed.

Using the same control curve or function $T(\varphi)$ as in the forward movement VR in the two working phases, including the two reversing phases in the backward movement RR, has the advantage, on the one hand, that the tool 300 can be controlled in a positionally accurate or motionally accurate manner and is located in the correct position, particularly during introduction into the thread groove, and in this way the forces during reversing can be kept very low and/or a high reversing or retraction speed is made possible.

In one embodiment of an implementation of the described dependencies or functions for $T(\varphi)$, the values of the penetration depth T are used as input parameters measured or predefined by the controller or programming, and the associated values of the rotation angle $\varphi$ are obtained from the dependency by means of the associated pitch parameters P and $P_i$.

Thus, a CNC program for thread cutting or thread forming can be selected, in particular with a G33, in particular G331 and G332, path condition with a thread pitch to be entered, and a sequence or quantity of values for the penetration depth can now be specified in which a changeover is made to a new thread pitch parameter, the thread pitch parameter being maintained up to the next value of the penetration depth.

A sequence would be, for example,

Working Movement

At penetration depth T=0, select the thread pitch parameter P and maintain this until $T=T_0$. A speed of rotation or rotational speed is set.

At $T=T_0$, change to thread pitch parameter $P_1$ and maintain this until $T=T_1$.

At $T=T_i$, change to thread pitch parameter $P_{i+1}$ and maintain this until $T=T_{i+1}$ for all i with $1 \leq i \leq n$.

Reduce the rotational speed or speed of rotation to 0 at $T=T_n$.

And preferably, for the reversing movement:

At $T=T_n$, reverse the axial feed movement and the rotary movement at a set speed of rotation or rotational speed and start again in each case in the opposite direction with thread pitch parameter $P_n$ and maintain this until $T=T_{n-1}$.

At $T=T_j$, change to thread pitch parameter P; and maintain this until $T=T_{j-1}$ for all j as descending index with $1 \leq j \leq n-1$.

At $T=T_0$, select thread pitch parameter P and maintain this until T=0.

Even if this embodiment of the working movement in the second working phase and/or reversing movement in the first reversing phase, which in particular corresponds to a linear interpolation, has advantages due to its simple implementation in existing machine programs, it is also possible according to the invention to provide other dependencies or functions or interpolations in individual partial steps or partial intervals for the relationship between T and p or combinations thereof in all the embodiments.

With the linear interpolation described, in particular according to FIGS. 5 and 6, the linear curve segments or graph segments are appended continuously to one another, i.e. the starting points $(\varphi_i, T_i)$ of each interval correspond to the end points of the respectively preceding interval and, in the case of the first interval, to the end point $(\varphi_0, T_0)$ of the linear graph of thread creation. These connection points are also referred to as interpolation points.

In all embodiments or interpolations, it is also possible, instead of linear segments, to select curve segments or graph segments which are appended (or: linked, connected) to one another in a continuously differentiable manner. This means that not only does the starting point of each interval coincide with the end point of the preceding interval, that is to say there is a continuous transition at the connection points between the intervals, but in addition the graph segments or their functions can also be differentiated at these connection points and their derivatives have the same value. As a result, smooth or continuously differentiable transitions between the graphs are achieved in the individual braking steps or intervals, which is conducive to the motion sequence. The transition at the rotation angle $\varphi_0$ from the thread creation movement in the first working phase to the braking movement AB in the second working phase, or then correspondingly preferably also from the first reversing phase to the second reversing phase, is preferably continuously differentiable or selected with the same slope.

Examples of functions which are suitable for such a continuously differentiable interpolation are polynomials of a degree higher than 1, in particular of the third degree, such as, for example, cubic splines.

Spline interpolation can be used here. Using a $3^{rd}$ degree polynomial function as spline function $$T(\varphi) = a_3\varphi^3 + a_2\varphi^2 + a_1\varphi + a_0$$

with the boundary conditions customary in spline interpolation, it is possible, for example, to create a function which is continuous as far as the third derivative.

Furthermore, it is also possible to use a continuous function, in particular a function which falls strictly monotonically or else monotonically, for the braking process or at least a predominant part of the braking steps $S_i$, e.g. an exponential function or logarithmic function.

In a further embodiment of an implementation of the described dependencies or functions for $T(\varphi)$, the values of the rotation angle $\varphi$ are used as input parameters measured or predefined by the controller or programming, and the associated values of the penetration depth T are obtained from the dependency by means of the pitch parameters P and $P_i$.

In a third variant, it is also possible for the time to be predefined as an input parameter, and the values of the rotation angle $\varphi(t)$ and of the penetration depth $T(t)$ are obtained from the dependency on the time t and the dependency on one another by means of the pitch parameters P and $P_i$.

In one embodiment, control or synchronization can take place in an open regulating or control circuit without measuring the process variables penetration depth and rotation angle. In this case, a penetration depth value is assigned to each rotation angle value by means of a value table or by calculation according to the stored formulas, and the rotary drive and axial drive are controlled in a corresponding manner.

In a further embodiment, a measurement of at least one of the two process variables penetration depth and rotation angle can also be carried out and the measured values can be fed back into the controller in order to implement control according to the desired curve shown in FIG. 4 in a closed control loop. The rotation angle $\varphi$ is as a rule determined in the region of the drive, in particular of the drive spindle, by means of rotation angle sensors or measurement of physical variables which have a clear relationship to the rotation angle. However, it is also possible in principle to measure the rotation angle directly at the tool 100, 200, 300. The penetration depth T can be measured by axial position sensors and, here again, generally at the drive, in particular the drive spindle, or else, in a special embodiment, at the tool or workpiece itself.

FIG. 7 to FIG. 10 show contours of revolution which are formed by the end and/or main cutting edges or thread creation means.

The thread-cutting teeth in FIG. 7 to FIG. 10 are arranged on the end and/or main cutting edges, in particular on each end and/or main cutting edge. The thread-cutting teeth are integral with the end and/or main cutting edges.

The thread-cutting teeth in FIG. 7 to FIG. 10 are preferably arranged on the tap bodies, in particular on each tap body. The thread-cutting teeth are integral with the tap bodies.

Here, FIG. 7 shows a contour of revolution created by three end and/or main cutting edges or thread creation means, in particular on the tap bodies. In this case, the first end and/or main cutting edge or the first tap body forms thread-cutting teeth 411 and 412. The second end and/or main cutting edge or the second tap body forms thread-cutting teeth 421 and 422. The third end and/or main cutting edge forms thread-cutting tooth 431.

The first thread-cutting tooth 411 of the first end and/or main cutting edge or of the first tap body and the second thread-cutting tooth 421 of the second end and/or main cutting edge or of the second tap body jointly form the contour of revolution for the countersink 401, at an angle 470 of 30°.

The second thread-cutting tooth 421 is at a distance 472 from the third thread-cutting tooth 431 along the countersink profile 401.

On the outside of the third thread-cutting tooth 431 and of each thread-cutting tooth following this end and/or main cutting edge, the contour of revolution has a width 471 which corresponds to the thread pitch of the thread-cutting tooth along the outside of the end and/or main cutting edge.

FIG. 8 shows a contour of revolution created by four end and/or main cutting edges or thread creation means, in particular on the tap bodies. The first thread-cutting tooth 511 of the first end and/or main cutting edge or of the first tap body and the second thread-cutting tooth 521 of the second end and/or main cutting edge or of the second tap body jointly form the contour of revolution for the countersink 501, at an angle 570 of 30°. The third thread-cutting tooth 531 of the third end and/or main cutting edge or of the third tap body jointly forms the contour of revolution for the countersink 501, at an angle 570 of 30°.

There is no spacing between the second thread-cutting tooth 521 and the third thread-cutting tooth 531 along the countersink profile 501.

FIG. 9 shows a contour of revolution created by five end and/or main cutting edges or five thread creation means. The first thread-cutting tooth 611 of the first end and/or main cutting edge and the second thread-cutting tooth 621 of the second end and/or main cutting edge jointly form the contour of revolution for the countersink 601, at an angle 670 of 30°. The third thread-cutting tooth 631 of the third end and/or main cutting edge and the fourth thread-cutting tooth 641 of the fourth end and/or main cutting edge jointly form the contour of revolution for the countersink 601, at an angle 670 of 30°.

FIG. 10 shows a contour of revolution created by six end and/or main cutting edges or six thread creation means. The first thread-cutting tooth 711 of the first end and/or main cutting edge and the second thread-cutting tooth 721 of the second end and/or main cutting edge jointly form the contour of revolution for the countersink 701, at an angle 770 of 30°. The third thread-cutting tooth 731 of the third end and/or main cutting edge and the fourth thread-cutting tooth 741 of the fourth end and/or main cutting edge jointly form the contour of revolution for the countersink 701, at an angle 770 of 30°.

Each of the thread creation means 163, 263, 363, 400, 500, 600, 700 has a respective contour of revolution or can have a contour of revolution.

In particular, the contour of revolution forms a cutting edge contour for the at least one countersink. In particular, the contour of revolution forms an envelope curve and/or envelope contour, wherein the envelope curve and/or envelope contour are/is formed by the countersink cutting edges.

An envelope curve and/or envelope contour and/or contour of revolution is, in particular, the envelope curve and/or envelope contour and/or contour of revolution and/or contour obtained when the tool is rotated about its tool axis.

The end region 117, 217, 317 in each case comprises a drilling region for drilling a through-hole.

The drilling region comprises at least two end and/or main cutting edges, on at least two tap bodies, for creating the through-hole, which extend into the thread creation region for creating the through-thread.

Flutes extend in each case between the end and/or main cutting edges through the thread creation region 116, 216, 316 and into the at least one flute or neck region 112, 212, 312.

The at least two end and/or main cutting edges form the countersink cutting edges and/or the contour of revolution on the outside diameter.

The tool, in particular the thread creation means, is designed in such a way that it has or creates an at least substantially closed envelope curve and/or envelope contour.

In particular, the tool is designed in such a way that it has or creates a closed envelope curve and/or envelope contour.

The tool has at least three end and/or main cutting edges, in particular, according to FIG. 8, at least four end and/or main cutting edges, preferably, according to FIG. 10, at least five end and/or main cutting edges.

The countersink has a countersink angle 470, 570, 670, 770 which is greater than 25° and less than 60°, preferably between 30° and 45°, in particular at least substantially 30°.

The envelope curve and/or envelope contour 401, 501, 601, 701 are/is formed by at least one first end and/or main cutting edge 411, in particular a first shank-side thread-cutting tooth, as a first countersink cutting edge and a second end and/or main cutting edge 421, in particular a second shank-side thread-cutting tooth, as a second countersink cutting edge, which, in particular jointly, form a closed envelope curve and/or envelope contour 401, 501, 601, 701 during rotation.

The envelope curve and/or envelope contour 401, 501, 601, 701 are/is conical, particularly in the countersinking region.

The first shank-side thread-cutting tooth 411 and the second shank-side thread-cutting tooth 421 are ground down in such a way with respect to the further thread-cutting teeth of the end and/or main cutting edges that the envelope curve and/or envelope contour of the first shank-side thread-cutting tooth forms the innermost ring of the at least one countersink with the countersink angle, and that the envelope curve and/or the envelope contour of the second shank-side thread-cutting tooth forms the second-innermost ring, surrounding the innermost ring, of the at least one countersink with the countersink angle.

The second-innermost ring directly surrounds the innermost ring of the at least one countersink and thus at least partially forms the conical countersink 402, 501, 601, 701.

LIST OF REFERENCE SIGNS

100, 200, 300 tool
211 shank region
112, 212, 312 first neck region
215 first conical region
214 second neck region
213 second conical region
116, 216, 316 thread creation region, thread creation means
117, 217, 317 end region
120, 220, 320 end face
130, 230, 330 tap body
132, 232, 332 flute 134, 234, 334 tap body
136, 236, 336 flute
150, 250, 350 workpiece
151, 251, 351 first workpiece side
152, 252, 352 second workpiece side
218 guide region
262 second countersink
163, 263, 363 through-thread
164, 264, 364 first countersink
171, 271, 371 thread profile
172, 272, 372 thread pitch
400,500,600,700 thread creation means
401,501,601,701 envelope curve, countersink profile
470,570,670,770 countersink angle
471,472 distances
411,412,421,422,431 thread-cutting teeth, thread-cutting tooth contours
511,521,531 thread-cutting teeth, thread-cutting tooth contours
611,621,631,641 thread-cutting teeth, thread-cutting tooth contours
711,721,731,741,751 thread-cutting teeth, thread-cutting tooth contours
r radial deflection
A tool axis
V feed
VR forward direction
RR backward direction
α rotation angle
P11, P21, P31 first position
P12, P22, P32 second position
P13, P23, P33 second position
AB braking movement
BB acceleration movement
M thread center axis
P thread pitch
$P_1$ to $P_{10}$ pitch parameters
$S_1$ to $S_{10}$ braking step
$S_{11}$ to $S_{20}$ acceleration step
T penetration depth
$T_G$ thread depth
$T_L$ threaded hole depth
$T_0$ to $T_{10}$ depth value
$T_i$, $T_n$ depth value
ΔT penetration depth range
UP reversal point
VB forward movement
RB backward movement
φ summed rotation angle
Δφ rotation angle range
$φ_0$ to $φ_{20}$ rotation angle value
$φ_i$, $φ_n$ rotation angle value
δ thread pitch angle

The invention claimed is:

1. A method for creating a through-thread with a predefined thread pitch and with a predefined thread profile with at least one countersink in a workpiece by means of a tool, wherein:
   a) the tool can be rotated about a tool axis (A) extending through the tool and moved axially in relation to the tool axis by means of a turning device,
   b) the tool has, sequentially in the direction of an end face thereof,
      b1) a shank region for coupling to the turning device,
      b2) at least one neck region for transporting away chips,
      b3) a thread creation region with a thread creation means for creating the through-thread, and
      b4) an end region having the end face, wherein the end region comprises a drilling region for drilling a through-hole, wherein the drilling region comprises at least two end cutting edges,
   c) to create the through-thread, the thread creation means is moved in a screw-in movement in an axial forward direction (VR) through the workpiece from a first workpiece side to a second workpiece side opposite the first workpiece side such that the end face projects out of the workpiece, wherein the thread creation means is moved through the workpiece, along a first line, which is a helical line, wherein the through-thread created with the aid of end-side thread-cutting teeth, wherein the thread-cutting teeth jointly create the through-threaded in the screw-in movement, wherein the thread-cutting teeth jointly form the thread creation means, wherein the thread-cutting teeth are arranged on the end cutting edges,
   d) then, to create at least one countersink, the thread creation means is moved in a countersinking movement, along a second line that differs from the first line, wherein the countersinking movement takes place in the forward direction and/or in the backward direction and/or as reverse countersinking, wherein a feed is reduced during the countersinking movement in such a way that the feed during one revolution of the tool is less than the predefined thread pitch, wherein the thread-cutting teeth jointly create the countersink in the countersinking movement, wherein the thread-cutting teeth jointly form both the countersinking means and create the through-thread, wherein the countersink is cylindrical, with a diameter which is greater than the maximum diameter of the thread profile, wherein the countersinking movement is a braking movement, wherein the braking movement takes place in defined partial steps as braking steps, wherein in each braking step, a synchronization of the axial feed and the rotation angle in accordance with the control of a threading process is set or programmed such that an associated predetermined function with an associated value interval over an associated rotation angle interval is assigned or programmed to each braking step, and
   e) for subsequent withdrawal, the thread creation means is moved back through the workpiece in a screw-out movement in an axial backward direction (RR), along the first line.

2. The method as claimed in claim 1, wherein:
   a) to create the through-thread, the thread creation means is moved in the screw-in movement in the axial forward direction (VR) through the workpiece from a first position (P11, P21, P31) on a first workpiece side to a second position (P12, P22, P32) on a second workpiece side opposite the first workpiece side such that the end face projects out of the workpiece at the second position (P12, P22, P32), and the thread creation means is moved through the workpiece along a first line which is a helical line,
   b) then, to create at least one countersink in the countersinking movement, the thread profile is moved in a rotary movement from the second position (P12, P22, P32) along a second line that differs from the first line to a third position (P13, P23, P33) or back to the second position (P12, P22, P32), and
   c) for subsequent withdrawal, the thread creation means is moved back in the screw-out movement from the second position (P12, P22, P32), or from the third position (P13, P23, P33), through the workpiece along the first line to the first position (P11, P21, P31) in an axial backward direction (RR).

3. The method as claimed in claim 1,
wherein the screw-in movement comprises a rotary movement of the tool with a predefined direction of rotation about the tool axis (A) and an axial feed movement (V), which is synchronized with the rotary movement according to the thread pitch, in the axial forward direction (VR) axially with respect to the tool axis (A) such that an axial feed of the tool by the predefined thread pitch corresponds to a full revolution of the tool about the tool axis (A) and/or such that the thread creation means is moved through the workpiece on a first line in order to create the through-thread, wherein the first line is a helical line.

4. The method as claimed in claim 1, wherein:
the second line comprises a second helical line in the axial forward direction (VR) and/or the backward direction (RR) such that less than an axial feed of the tool by the predefined thread pitch corresponds to a full revolution of the tool about the tool axis (A), or
the second line comprises a circular movement with an at least substantially constant axial feed.

5. The method as claimed in claim 1, wherein:
the thread creation region comprises the thread creation means, which is arranged at the end face, wherein the thread creation means comprises exactly one thread groove, and wherein the thread creation means is interrupted by at least one flute, and
the thread creation means has at least one thread tooth, which is designed and arranged to match the predefined thread pitch, and has an effective profile which corresponds to the thread profile of the through-thread, wherein the at least one thread tooth cuts the thread into the workpiece.

6. The method as claimed in claim 1, wherein:
at least one thread tooth is moved through the workpiece on the helical line during the screw-in movement, and the countersinking movement comprises or is reverse countersinking.

7. The method as claimed in claim 1, wherein:
the at least one neck region has a first neck region and a second neck region,
the first neck region has a first neck diameter and the second neck region has a second neck diameter, wherein the first neck diameter is greater than the second neck diameter, and
a first conical region is arranged between the neck region and the thread creation region, and
a second conical region is arranged between the first neck region and the second neck region, wherein the first conical region widens the neck diameter of the tool in the direction of the end face and the second conical region tapers the neck diameter of the tool in the direction of the end face.

8. The method as claimed in claim 1, wherein
the drilling region comprises at least two main cutting edges, wherein a guide region is formed on the outer sides thereof,
the guide region is of cylindrical design, the two end and/or main cutting edges each interrupt the guide region.

9. The method as claimed in claim 1, wherein a through-hole, the through-thread and the at least one countersink can be or are created in one operation by means of the same tool, by means of a feed movement in the forward direction (VR) on the helical line, a countersinking process directly following this and a backward movement, directly following this, in the backward direction (RR) on the helical line.

10. The method as claimed in claim 1, wherein from the at least one neck region as far as the end face, exactly two, exactly three, at least two or at least three tap bodies extend parallel to the tool axis (A) or spirally with a twist angle (B) about the tool axis (A), and are separated from one another by flutes.

11. The method as claimed in claim 1, wherein flutes extend from the end and/or main cutting edges through the thread creation region and the at least one flute or neck region, thus enabling chips to be transported away rearward from the end and/or main cutting edges.

12. The method as claimed in claim 1, wherein:
a first countersinking means comprises a first conical region and/or the thread creation region, wherein the first conical region merges directly into the thread creation region, and
a first countersinking means is formed by a first conical region on the tool and/or wherein a second countersinking means is formed by a second conical region on the tool.

13. The method as claimed in claim 1, wherein the distance between a first and second countersinking means corresponds substantially to the thickness of the workpiece.

14. The method as claimed in claim 1, wherein, during the creation of the through-thread, a through-hole is simultaneously produced by means of the tool during the screw-in movement, or wherein the through-thread is created in a through-hole.

15. The method as claimed in claim 1, wherein:
the countersinking movement is a circular movement by means of which a countersink is produced on the first and/or on the second workpiece side by means of a first countersinking means and/or a countersink is produced on the first workpiece side by means of a second countersinking means, and
the tool axis (A) of the tool is deflected by a predefined radius (r) from the thread center axis (M) during the circular movement, and the tool is moved on a circular path with the predefined radius (r) about the thread center axis, wherein the tool is additionally rotated about its tool axis (A).

16. The method as claimed in claim 1, wherein:
during the countersinking movement, a first countersink is made by means of a first countersinking means through a first conical region on the tool; and
a second countersink is simultaneously made by means of a second countersinking means through a second conical region on the tool.

17. The method as claimed in claim 1, wherein:
the countersink creates a chamfer on the first and/or second workpiece side and/or at the start and/or end of the through-thread.

18. The method as claimed in claim 1, wherein:
the countersinking movement is a movement along a circular line by means of which a cylindrical countersink, is produced on the first workpiece side by means of a/the first countersinking means, and
the countersinking movement is a non-helical movement by means of which a countersink is produced on the second workpiece side.

19. The method as claimed in claim 1, wherein:
to create the countersink, an end face is moved from a second position (P12, P22, P32) to a third position (P13, P23, P33) in a forward direction, and the second and third positions each lie on the helical line, or to create the countersink, an end face is moved from a second position (P12, P22, P32) to a third position (P13, P23, P33) in a backward direction, and the second and third positions each lie on the helical line, or to create the countersink, an end face is moved in a forward direction from a second position (P12, P22, P32) to a third position (P13, P23, P33) and then in a backward direction again to the second position.

20. The method as claimed in claim 1, wherein:
the countersink is created on the first and/or second workpiece side and/or at the start and/or end of the through-thread.

21. The method as claimed in claim 1, wherein:
a first position (P11, P21, P31) is arranged at an entry point to the workpiece and/or a second position (P12, P22, P32) is arranged at an exit point from the workpiece, and/or
at least one feed (V) and one rotation angle (□) are assigned to the first and second positions (P11-P13, P21-P23, P31-P33) of the tool (100), and/or
a position (P11-P13, P21-P23, P31-P33) is defined by a rotation angle (□), a linear displacement (V) in the axial direction and a radial deflection (r) of the tool of the tool axis (A) from the thread center axis (M).

22. A tool for carrying out the method as claimed in claim 1, having an end face, comprising, sequentially in the direction of the end face thereof:
a shank region for coupling to the turning device,
at least one neck region,
a thread creation region with a thread creation means for creating the through-thread, and
an end region having the end face, wherein the end region comprises a drilling region for drilling a through-hole, wherein the drilling region comprises at least two end cutting edges, wherein end-side thread-cutting teeth for creating the through-thread are arranged on the end cutting edges, wherein the thread-cutting teeth jointly form the thread creation means, wherein the thread-cutting teeth jointly form both countersinking means and create the through-thread, wherein to create at least one countersink, the thread creation means is configured to move in a countersinking movement, wherein the countersinking movement is configured to take place in the forward direction and/or in the backward direction and/or as reverse countersinking, wherein a feed is reduced during the countersinking movement in such a way that the feed during one revolution of the tool is less than the predefined thread pitch, wherein the thread-cutting teeth jointly create the countersink in the countersinking movement, wherein the thread-cutting teeth jointly form both the countersinking means and create the through-thread, wherein the countersink is cylindrical, with a diameter which is greater than the maximum diameter of the thread profile, wherein the countersinking movement is a braking movement, wherein the braking movement is configured to take place in defined partial steps as braking steps, wherein in each braking step, a synchronization of an axial feed and a rotation angle in accordance with the control of a threading process is set or programmed such that an associated predetermined function with an associated value interval over an associated rotation angle interval is assigned or programmed to each braking step.

23. The tool for carrying out the method as claimed in claim 22, wherein the tool comprises a thread-forming tap, a thread-milling cutter or a thread-cutting tap and/or a drill.

24. The tool for carrying out the method as claimed in claim 22, wherein:
the thread creation means has a contour of revolution,
the contour of revolution forms a cutting edge contour for the at least one countersink, and
the contour of revolution forms an envelope curve and/or envelope contour, wherein the envelope curve and/or envelope contour are/is formed by countersink cutting edges.

25. The tool for carrying out the method as claimed in claim 22, wherein:
the drilling region comprises at least two end and/or main cutting edges on at least two tap bodies, for creating the through-hole, which extend into the thread creation region for creating the through-thread,
flutes extend between the end and/or main cutting edges through the thread creation region and into the at least one flute or neck region, and
the at least two main cutting edges form countersink cutting edges and/or a contour of revolution on the outside diameter.

26. The tool for carrying out the method as claimed in claim 22, wherein:
the thread creation means is designed in such a way that it has or creates an at least substantially closed envelope curve and/or envelope contour,
the tool is designed in such a way that it has or creates a closed envelope curve and/or envelope contour, and
the tool has at least five end and/or main cutting edges.

27. The tool for carrying out the method as claimed in claim 22, wherein:
at least one countersink has a countersink angle which is at least substantially 30°, and
an envelope curve and/or an envelope contour are/is formed by at least one first end and/or main cutting edge a first shank-side thread-cutting tooth, as a first countersink cutting edge and a second end and/or main cutting edge a second shank-side thread-cutting tooth, as a second countersink cutting edge, which jointly, form a closed envelope curve and/or envelope contour during rotation, and
an envelope curve and/or an envelope contour are/is at least substantially conical.

28. The tool for carrying out the method as claimed in claim 22, wherein:
the end-side thread-cutting teeth comprise a first shank-side thread-cutting tooth and a second shank-side thread-cutting tooth that are ground down in such a way with respect to other thread-cutting teeth of the end-side thread-cutting teeth and/or main cutting edges that (i) an envelope curve and/or an envelope contour of the first shank-side thread-cutting tooth forms an innermost ring of at least one countersink with a countersink angle, and that (ii) an envelope curve and/or the envelope contour of the second shank-side thread-cutting tooth forms a second-innermost ring, surrounding the innermost ring, of the at least one countersink with the countersink angle; and
the second-innermost ring directly surrounds the innermost ring of the at least one countersink on the outside thereof, and thus at least partially forms a conical countersink.

* * * * *